United States Patent
Chang et al.

(10) Patent No.: US 11,061,169 B2
(45) Date of Patent: Jul. 13, 2021

(54) CONTACT LENS WITH PHOSPHORYLCHOLINE-MODIFIED POLYVINYLALCOHOLS THEREIN

(71) Applicant: Alcon Inc., Fribourg (CH)

(72) Inventors: Frank Chang, Cumming, GA (US); Houliang Tang, Alpharetta, GA (US); Troy Vernon Holland, Suwanee, GA (US); Adam K. Sniady, Lilburn, GA (US)

(73) Assignee: Alcon Inc., Fribourg (CH)

(*) Notice: Subject to any disclaimer, the term of this patent is extended or adjusted under 35 U.S.C. 154(b) by 0 days.

(21) Appl. No.: 16/683,886

(22) Filed: Nov. 14, 2019

(65) Prior Publication Data

US 2020/0158913 A1    May 21, 2020

Related U.S. Application Data

(60) Provisional application No. 62/767,563, filed on Nov. 15, 2018.

(51) Int. Cl.

| | |
|---|---|
| *G02B 1/04* | (2006.01) |
| *C08F 216/06* | (2006.01) |
| *C08F 216/38* | (2006.01) |
| *C08F 218/08* | (2006.01) |
| *C08F 230/02* | (2006.01) |
| *G02B 1/10* | (2015.01) |
| *G02C 7/04* | (2006.01) |

(52) U.S. Cl.
CPC ............ *G02B 1/043* (2013.01); *C08F 216/06* (2013.01); *C08F 216/38* (2013.01); *C08F 218/08* (2013.01); *C08F 230/02* (2013.01); *G02B 1/10* (2013.01); *G02C 7/04* (2013.01)

(58) Field of Classification Search
CPC .................................................. G02B 1/043
See application file for complete search history.

(56) References Cited

U.S. PATENT DOCUMENTS

| | | |
|---|---|---|
| 3,408,429 A | 10/1968 | Wichterle |
| 4,136,250 A | 1/1979 | Mueller |
| 4,153,641 A | 5/1979 | Deichert et al. |
| 4,182,822 A | 1/1980 | Chang |
| 4,189,546 A | 2/1980 | Deichert et al. |
| 4,254,248 A | 3/1981 | Friends et al. |
| 4,259,467 A | 3/1981 | Keogh et al. |
| 4,260,725 A | 4/1981 | Keogh et al. |
| 4,261,875 A | 4/1981 | LeBoeuf |
| 4,276,402 A | 6/1981 | Chromecek et al. |
| 4,327,203 A | 4/1982 | Deichert et al. |
| 4,341,889 A | 7/1982 | Deichert et al. |
| 4,343,927 A | 8/1982 | Chang |
| 4,347,198 A | 8/1982 | Ohkada et al. |
| 4,355,147 A | 10/1982 | Deichert et al. |
| 4,444,711 A | 4/1984 | Schad |
| 4,460,534 A | 7/1984 | Boehm et al. |
| 4,486,577 A | 12/1984 | Mueller et al. |
| 4,543,398 A | 9/1985 | Bany et al. |
| 4,605,712 A | 8/1986 | Mueller et al. |
| 4,661,575 A | 4/1987 | Tom |
| 4,684,538 A | 8/1987 | Klemarczyk |
| 4,703,097 A | 10/1987 | Wingler et al. |
| 4,721,800 A | 1/1988 | Chapman |
| 4,833,218 A | 5/1989 | Lee |
| 4,837,289 A | 6/1989 | Mueller et al. |
| 4,954,586 A | 9/1990 | Toyoshima et al. |
| 4,954,587 A | 9/1990 | Mueller |
| 5,010,141 A | 4/1991 | Mueller |
| 5,034,461 A | 7/1991 | Lai et al. |
| 5,039,761 A | 8/1991 | Ono et al. |
| 5,070,170 A | 12/1991 | Robertson et al. |
| 5,079,319 A | 1/1992 | Mueller |

(Continued)

FOREIGN PATENT DOCUMENTS

| | | |
|---|---|---|
| EP | 0632329 A1 | 1/1995 |
| EP | 1750161 A1 | 2/2007 |

(Continued)

OTHER PUBLICATIONS

Miyazawa, K.; Winnik, F M., Solution Properties of Phosphorylcholine-Based Hydrophobically Modified Polybetaines in Water and Mixed Solvents, Macromolecules, 2002, 35, pp. 9536-9544.

Gao, W.; Feng, Y.; Lu, J.; Khan, M.; Guo, Biomimetic Surface Modification of Polycarbonateurethane Film via Phosphorylcholine-Graft for Resisting Platelet Adhesion, Macromolecular Research, vol. 20, No. 10, 2012, pp. 1063-1069.

Kitayama, Y., Takeuchi, T., Localized Surface Plasmon Resonance Nanosensing of C-Reactive Protein with Poly(2-methacryloyloxyethyl phosphorylcholine)-Grafted Gold Nanoparticles Prepared by Surface-Initiated Atom Transfer Radical Polymerization, Analytical Chemistry, American Chemical Society, 2014, 86, pp. 5587-5594.

(Continued)

*Primary Examiner* — Michael F Pepitone
(74) *Attorney, Agent, or Firm* — Jian Zhou

(57) ABSTRACT

The invention is generally related to a soft contact lens which comprises a hydrogel lens body and a coating thereon and to a method for producing the same. The hydrogel lens body is composed of a crosslinked polymeric material comprising repeating units of at least one arylborono-containing vinylic monomer having a boronic acid group, and the coating comprises a layer of a phosphorylcholine-containing polymer which comprises (a) repeating units of vinyl alcohol, and (b) repeating units of 6-membered acetal ring substituted with a phosphorylcholine-containing group. The coating is covalently-attached to the hydrogel lens body through cyclic boronic ester linkages each formed between one of the boronic acid groups of the crosslinked polymeric material and one of the 1,2-diol and 1,3-diol moieties of the phosphorylcholine-containing polymer.

26 Claims, No Drawings

(56) References Cited

U.S. PATENT DOCUMENTS

| | | |
|---|---|---|
| 5,346,946 A | 9/1994 | Yokoyama et al. |
| 5,358,995 A | 10/1994 | Lai et al. |
| 5,387,632 A | 2/1995 | Lai et al. |
| 5,416,132 A | 5/1995 | Yokoyama et al. |
| 5,449,729 A | 9/1995 | Lai |
| 5,451,617 A | 9/1995 | Lai et al. |
| 5,486,579 A | 1/1996 | Lai et al. |
| 5,508,317 A | 4/1996 | Mueller |
| 5,583,163 A | 12/1996 | Mueller |
| 5,665,840 A | 9/1997 | Poehlmann et al. |
| 5,712,356 A | 1/1998 | Bothe et al. |
| 5,760,100 A | 6/1998 | Nicolson et al. |
| 5,789,464 A | 8/1998 | Mueller |
| 5,843,346 A | 12/1998 | Morrill |
| 5,849,810 A | 12/1998 | Mueller |
| 5,849,841 A | 12/1998 | Muehlebach et al. |
| 5,894,002 A | 4/1999 | Boneberger et al. |
| 5,962,548 A | 10/1999 | Vanderlaan et al. |
| 5,981,675 A | 11/1999 | Valint et al. |
| 6,039,913 A | 3/2000 | Hirt et al. |
| 6,165,408 A | 12/2000 | Steinmann |
| 6,221,303 B1 | 4/2001 | Steinmann |
| 6,303,687 B1 | 10/2001 | Mueller |
| 6,472,489 B1 | 10/2002 | Stockinger |
| 6,479,587 B1 | 11/2002 | Stockinger et al. |
| 6,492,478 B1 | 12/2002 | Steinmann |
| 6,627,124 B1 | 9/2003 | Herbrechtsmeier et al. |
| 6,762,264 B2 | 7/2004 | Kuenzler et al. |
| 6,800,225 B1 | 10/2004 | Hagmann et al. |
| 6,867,245 B2 | 3/2005 | Iwata et al. |
| 6,995,192 B2 | 2/2006 | Phelan |
| 7,214,809 B2 | 5/2007 | Zanini et al. |
| 7,384,590 B2 | 6/2008 | Kelly et al. |
| 7,387,759 B2 | 6/2008 | Kelly et al. |
| 7,423,074 B2 | 9/2008 | Lai |
| 7,605,190 B2 | 10/2009 | Moszner et al. |
| 7,977,430 B2 | 7/2011 | Devlin et al. |
| 8,088,313 B2 | 1/2012 | Hagmann et al. |
| 8,236,873 B2 * | 8/2012 | Suda ............... G02B 1/043 523/106 |
| 8,415,405 B2 | 4/2013 | Maggio |
| 8,475,529 B2 | 7/2013 | Clarke |
| 8,529,057 B2 | 9/2013 | Qiu et al. |
| 8,614,261 B2 | 12/2013 | Iwata et al. |
| 8,647,658 B2 | 2/2014 | Pruitt |
| 8,658,748 B2 | 2/2014 | Liu |
| 8,993,651 B2 | 3/2015 | Chang et al. |
| 9,097,840 B2 | 8/2015 | Chang |
| 9,103,965 B2 | 8/2015 | Chang |
| 9,217,813 B2 | 12/2015 | Liu |
| 9,475,827 B2 | 10/2016 | Chang |
| 10,081,697 B2 | 9/2018 | Huang |
| 2009/0182067 A1 | 7/2009 | Liu |
| 2012/0026457 A1 | 2/2012 | Qiu |
| 2012/0088843 A1 | 4/2012 | Chang |
| 2012/0088844 A1 | 4/2012 | Kuyu |
| 2017/0158611 A1 | 6/2017 | Chang |
| 2018/0100038 A1 | 4/2018 | Jing |
| 2018/0100053 A1 | 4/2018 | Jing |
| 2018/0113236 A1 | 4/2018 | Bothe |

FOREIGN PATENT DOCUMENTS

| | | | |
|---|---|---|---|
| JP | 08182756 A | * | 7/1996 |
| JP | 2017146334 A | | 8/2017 |
| JP | 2017151437 A | | 8/2017 |
| WO | 99/26087 A1 | | 5/1999 |
| WO | 2016/140242 A1 | | 9/2016 |

OTHER PUBLICATIONS

Subhash C. Shit and Sukumar Maiti, Application of NMR Spectroscopy in Molecular Weight Determination of Polymers, Eur. Polym. J., vol. 22, No. 12, 1986, pp. 1001 1008.

Goda, T., Ishihara, K., Miyahara, Y., Critical update on 2-methacryloyloxyethyl phosphorylcholine (MPC) polymer science, Journal of Applied Polymer Science, 2015, 132, 41766, pp. 1-10.

Goda, T.,Kjall,P., Ishihara, K.,Richter-Dahlfors, A.,Miyahara, Y.,Biomimetic Interfaces Reveal Activation Dynamics of C-Reactive Protein in Local Microenvironments, Advanced Healthcare Materials, 2014, 3, pp. 1733-1738.

Goda, T.; Ishihara, K., Soft contact lens biomaterials from bioinspired phospholipid polymers, Expert Review of Medical Devices, Future Drugs Ltd, 2006, 3(2), pp. 167-174.

Gousse, C.; Gandini, A., Acetalization of polyvinyl alcohol with furfural, Eur. Polym. J., Elsevier Science Ltd., vol. 33, No. 5, 1997, pp. 667-671.

Josephat U. Izunobi and Clement L. Higginbotham, Polymer Molecular Weight Analysis by 1H NMR Spectroscopy, Journal of Chemical Education, American Chemical Society, 2011, 88, pp. 1098-1104.

Lu, J.; Feng, Y.; Gao, B.; Guo, J., Preparation and characterization of phosphorylcholine glyceraldehyde grafted polycarbonateurethane films, J. Polym. Res., 2012, 19:9959, pp. 1-11.

Peters, K; Millar, T.J., The role of different phospholipids on tear break-up time using a model eye, Current Eye Research, 2002, vol. 25, No. 1, pp. 55-60.

Shibatani, K.; Fujii, K., Reaction of Poly(vinyl Alcohol) with Formaldehyde and Polymer Stereoregularity. Model Compounds, Journal of Polymer Science, Part A-1, John Wiley & Sons, vol. 8, 1970, pp. 1647-1656.

* cited by examiner

CONTACT LENS WITH PHOSPHORYLCHOLINE-MODIFIED POLYVINYLALCOHOLS THEREIN

This application claims the benefit under 35 USC § 119 (e) of U.S. provisional application No. 62/767,563 filed 15 Nov. 2018, incorporated by reference in its entirety.

This invention is related to soft contact lenses containing leachable phosphorylcholine-modified polyvinylalcohol therein, to methods for making such contact lenses and to water-soluble phosphorylcholine-modified polyvinylalcohols and uses thereof.

BACKGROUND

Most commercially-available non-silicone hydrogel contact lenses are produced according to a conventional cast molding technique involving use of disposable plastic molds and a mixture of vinylic monomers and crosslinking agents. There are several disadvantages with the conventional cast-molding technique. For example, a traditional cast-molding manufacturing process often includes lens extraction in which unpolymerized monomers must be removed from the lenses by using an organic solvent. Use of organic solvents can be costly and is not environmentally friendly. In addition, disposable plastic molds inherently have unavoidable dimensional variations, because, during injection-molding of plastic molds, fluctuations in the dimensions of molds can occur as a result of fluctuations in the production process (temperatures, pressures, material properties), and also because the resultant molds may undergo non-uniformly shrinking after the injection molding. These dimensional changes in the mold may lead to fluctuations in the parameters of contact lenses to be produced (peak refractive index, diameter, basic curve, central thickness etc.) and to a low fidelity in duplicating complex lens design.

The above described disadvantages encountered in a conventional cast-molding technique can be overcome by using the so-called Lightstream Technology™ (Alcon), which involves (1) a lens-forming composition being substantially free of monomers and comprising a substantially-purified, water-soluble polyvinylalcohol (PVA) prepolymer with ethylenically-unsaturated groups, (2) reusable molds produced in high precision, and (3) curing under a spatial limitation of actinic radiation (e.g., UV/visible light), as described in U.S. Pat. Nos. 5,508,317, 5,583,163, 5,789,464, 5,849,810, 6,800,225, and 8,088,313. Non-silicone hydrogel Lenses produced according to the Lightstream Technology™ can have high consistency and high fidelity to the original lens design, because of use of reusable, high precision molds. In addition, contact lenses with high optical quality can be produced at relatively lower cost due to the short curing time, a high production yield, and free of lens extraction and in an environmentally friendly manner because of use of water as solvent for preparing lens formulations.

U.S. Pat. No. 8,647,658 discloses approaches for producing improved PVA-based contact lens products, which not only have initial insertion comfort but also are comfortable to wear for more than about 6 hours, by packaging and storing a hydrogel lens with two or more leachable polymeric lubricants incorporated therein in a relatively viscous packaging solution including a relatively low molecular weight polyethylene glycol (PEG) and a viscosity-enhancing hydrophilic polymer.

However, PVA-based contact lenses may still need to be improved to have a minimized discomfort associated with dry-eye conditions and/or working or living in dry environments, an enhanced end-of-day comfort, and a desired surface lubricity for ensuring a superior wearing comfort.

Therefore, there are still needs for a new PVA-based contact lens having a superior surface lubricity and for a method capable of producing such contact lenses.

SUMMARY

In one aspect, the invention provides a soft contact lens, comprising: a lens bulk material which is a crosslinked polymeric material having a polymer matrix; and at least one non-polymerizable preformed PC-containing polymer which comprises (a) first repeating units of vinyl alcohol and/or vinyl acetate and (b) second repeating units of 6-membered acetal ring substituted with a phosphorylcholine-containing group, wherein the non-polymerizable preformed PC-containing polymer is not covalently attached to the crosslinked polymeric material and is distributed within the polymer matrix.

In another aspect, the invention provides a coated soft contact lens, comprising: a lens body, wherein the lens body is composed of a crosslinked polymeric material comprising repeating units of at least one arylborono-containing vinylic monomer; and a coating thereon, wherein the coating comprises a layer of a phosphorylcholine-containing polymer which comprises (a) repeating units of vinyl alcohol, and (b) repeating units of 6-membered acetal ring substituted with a phosphorylcholine-containing group, wherein the coating is covalent attached onto the lens body through linkages each formed between one of the boronic acid groups of the crosslinked polymeric material and one of the 1,3-diol moieties of the phosphorylcholine-containing polymer.

In a further aspect, the invention provides an ophthalmic solution, comprising from about 0.01% to about 2% by weight of a PC-containing polymer which comprises (a) repeating units of vinyl alcohol and (b) repeating units of 6-membered acetal ring substituted with a phosphorylcholine-containing group; and at least one buffering agent for maintaining a pH, wherein the ophthalmic solution has a pH of from about 6.5 to about 9.0, a tonicity of from about 200 to about 450 milliosmol (mOsm) at 25° C., and a viscosity of from about 1 centipoise to about 5 centipoises at 25° C.

DETAILED DESCRIPTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

"About" as used herein means that a number referred to as "about" comprises the recited number plus or minus 1-10% of that recited number.

"Optional" or "optionally" means that the subsequently described event or circumstance can or cannot occur, and that the description includes instances where the event or circumstance occurs and instances where it does not.

A "contact Lens" refers to a structure that can be placed on or within a wearer's eye. A contact lens can correct, improve, or alter a user's eyesight, but that need not be the case.

A "soft contact lens" refers to a contact lens which has an elastic modulus (i.e., Young's modulus) of less than 2.5 MPa.

As used in this application, the term "hydrogel" or "hydrogel material" refers to a crosslinked polymeric material which is insoluble in water, but can hold at least 10 percent by weight of water in its three-dimensional polymer networks (i.e., polymer matrix) when it is fully hydrated.

As used in this application, the term "non-silicone hydrogel" refers to a hydrogel that is theoretically free of silicon.

As used in this application, the term "silicone hydrogel" refers to a hydrogel containing silicone. A silicone hydrogel typically is obtained by copolymerization of a polymerizable composition comprising at least one silicone-containing vinylic monomer or at least one silicone-containing vinylic macromer or at least one silicone-containing prepolymer having ethylenically unsaturated groups.

A "vinylic monomer" refers to a compound that has one sole ethylenically-unsaturated group.

The term "soluble", in reference to a compound or material in a solvent, means that the compound or material can be dissolved in the solvent to give a solution with a concentration of at least about 0.1% by weight at room temperature (i.e., from about 20° C. to about 30° C.).

The term "insoluble", in reference to a compound or material in a solvent, means that the compound or material can be dissolved in the solvent to give a solution with a concentration of less than 0.005% by weight at room temperature (as defined above).

The term "ethylenically unsaturated group" is employed herein in a broad sense and is intended to encompass any groups containing at least one >C=C<group. Exemplary ethylenically unsaturated groups include without limitation (meth)acryloyl

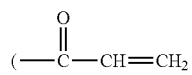

and/or

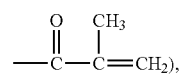

allyl, vinyl (—CH=CH$_2$) 1-methylethenyl

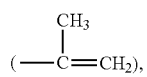

styrenyl, or the likes.

The term "(meth)acrylamide" refers to methacrylamide and/or acrylamide.

The term "(meth)acrylate" refers to methacrylate and/or acrylate.

A "hydrophilic vinylic monomer", as used herein, refers to a vinylic monomer which can be polymerized to form a homopolymer that is water-soluble or can absorb at least 10 percent by weight of water.

A "hydrophobic vinylic monomer" refers to a vinylic monomer which can be polymerized to form a homopolymer that is insoluble in water and can absorb less than 10 percent by weight of water.

An "acrylic monomer" refers to a vinylic monomer having one sole (meth)acryloyl group.

An "N-vinyl amide monomer" refers to an amide compound having a vinyl group (—CH=CH$_2$) that is directly attached to the nitrogen atom of the amide group.

As used in this application, the term "vinylic crosslinker" refers to a compound having at least two ethylenically unsaturated groups. A "vinylic crosslinking agent" refers to a subclass of vinylic crosslinkers each having a number average molecular weight of 700 Daltons or less.

As used in this application, the term "macromer" or "prepolymer" refers to a medium and high molecular weight compound or polymer that contains two or more ethylenically unsaturated groups. Medium and high molecular weight typically means number average molecular weights greater than 700 Daltons.

As used in this application, the term "vinylic crosslinker" refers to a compound having at least two ethylenically unsaturated groups. A "vinylic crosslinking agent" refers to a vinylic crosslinker having a number molecular weight of about 700 Daltons or less.

A "polysiloxane segment" refers to a polymer chain consisting of at least three consecutively- and directly-linked siloxane units (divalent radical) each independent of one another having a formula of

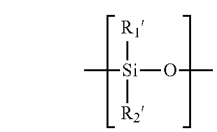

in which $R_1'$ and $R_2'$ are two substituents independently selected from the group consisting of $C_1$-$C_{10}$ alkyl, $C_1$-$C_4$ alkyl- or $C_1$-$C_4$-alkoxy-substituted phenyl, $C_1$-$C_{10}$ fluoroalkyl, $C_1$-$C_{10}$ fluoroether, $C_6$-$C_{18}$ aryl radical, -alk-(OC$_2$H$_4$)$_{\gamma 1}$—OR$^0$ (in which alk is $C_1$-$C_6$ alkyl diradical, R$^0$ is H or $C_1$-$C_4$ alkyl and γ1 is an integer from 1 to 10), a $C_2$-$C_{40}$ organic radical having at least one functional group selected from the group consisting of hydroxyl group (—OH), carboxyl group (—COOH), —NR$_3$'R$_4$', amino linkages of —NR$_3$'—, amide linkages of —CONR$_3$'—, amide of —CONR$_3$'R$_4$', urethane linkages of —OCONH—, and $C_1$-$C_4$ alkoxy group, or a linear hydrophilic polymer chain, in which $R_3'$ and $R_4'$ independent of each other are hydrogen or a $C_1$-$C_{15}$ alkyl.

A "polysiloxane vinylic monomer" refers to a compound comprising at least one polysiloxane segment and one sole ethylenically-unsaturated group.

A "polysiloxane vinylic crosslinker" refers to a compound comprising at least one polysiloxane segment and at least two ethylenically-unsaturated groups.

A "chain-extended polysiloxane vinylic crosslinker" refers to a compound comprising at least two ethylenically-unsaturated groups and at least two polysiloxane segments each pair of which is linked by one divalent radical.

As used in this application, the term "polymer" means a material formed by polymerizing/crosslinking one or more monomers or macromers or prepolymers.

As used in this application, the term "molecular weight" of a polymeric material (including monomeric or macromeric materials) refers to the number-average molecular weight unless otherwise specifically noted or unless testing conditions indicate otherwise. A person skilled in the art knows how to determine the molecular weight of a polymer according to known methods, e.g., GPC (gel permeation chromatochraphy) with one or more of a refractive index detector, a low-angle laser light scattering detector, a multi-angle laser light scattering detector, a differential viscometry detector, a UV detector, and an infrared (IR) detector; MALDI-TOF MS (matrix-assisted desorption/ionization time-of-flight mass spectroscopy); $^1$H NMR spectroscopy, etc.

In this application, a "6-membered acetal ring" refers to a moiety of

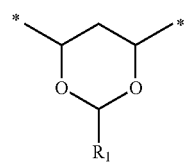

which can be formed in an acid-catalyzed reaction between a 1,3-diol moiety

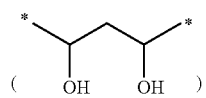

and a reactive acetal of

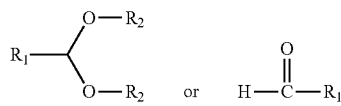

in which $R_1$ is an organic radical and $R_2$ is methyl or ethyl. *represents an organic radical.

The term "alkyl" refers to a monovalent radical obtained by removing a hydrogen atom from a linear or branched alkane compound. An alkyl group (radical) forms one bond with one other group in an organic compound.

The term "alkylene divalent radical" or "alkylene diradical" or "alkyl diradical" interchangeably refers to a divalent radical obtained by removing one hydrogen atom from an alkyl. An alkylene divalent group forms two bonds with other groups in an organic compound.

The term "alkyl triradical" refers to a trivalent radical obtained by removing two hydrogen atoms from an alkyl. A alkyl triradical forms three bonds with other groups in an organic compound.

The term "alkoxy" or "alkoxyl" refers to a monovalent radical obtained by removing the hydrogen atom from the hydroxyl group of a linear or branched alkyl alcohol. An alkoxy group (radical) forms one bond with one other group in an organic compound.

In this application, the term "non-polymerizable preformed polymer" in reference to a preformed polymer means that the preformed polymer is free of any polymerizable group.

In this application, the term "substituted" in reference to an alkyl diradical or an alkyl radical means that the alkyl diradical or the alkyl radical comprises at least one substituent which replaces one hydrogen atom of the alkyl diradical or the alkyl radical and is selected from the group consisting of hydroxy (—OH), carboxy (—COOH), —NH$_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, halogen atom (Br or Cl), and combinations thereof.

In this application, an "arylborono-containing vinylic monomer" refers to a vinylic monomer which comprises one sole arylborono group linked to its sole ethylenically unsaturated group through one linkage.

In this application, an "arylborono" group refers to a monovalent radical of

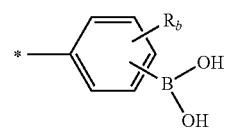

in which $R_b$ is H, NO$_2$, F, Cl, or CF$_3$.

As used in this application, the term "phosphorylcholine" (hereinafter designated as "PC") refers to a monovalent zwitterionic group of

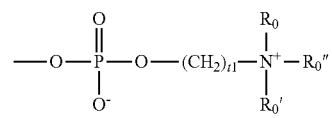

in which t1 is an integer of 1 to 5 and $R_0$, $R_0'$ and $R_0''$ independently of one another are $C_1$-$C_4$ alkyl.

An "initiator" refers to a chemical that can initiate free radical polymerizing reaction.

A "spatial limitation of actinic radiation" refers to an act or process in which energy radiation in the form of rays is directed by, for example, a mask or screen or combinations thereof, to impinge, in a spatially restricted manner, onto an area having a well-defined peripheral boundary. A spatial limitation of UV radiation is obtained by using a mask or screen having a radiation (e.g., UV and/or visible light) permeable region, a radiation (e.g., UV and/or visible light) impermeable region surrounding the radiation-permeable region, and a projection contour which is the boundary between the radiation-impermeable and radiation-permeable regions, as schematically illustrated in the drawings of U.S. Pat. No. 6,800,225 (FIGS. 1-11), and U.S. Pat. No. 6,627,124 (FIGS. 1-9), U.S. Pat. No. 7,384,590 (FIGS. 1-6), and U.S. Pat. No. 7,387,759 (FIGS. 1-6). The mask or screen allows to spatially projects a beam of radiation (e.g., UV radiation and/or visible radiation) having a cross-sectional profile defined by the projection contour of the mask or screen. The projected beam of radiation (e.g., UV radiation and/or visible radiation) limits radiation impinging on a lens formulation located in the path of the projected beam from the first molding surface to the second molding surface of a mold. The resultant contact lens comprises an anterior surface defined by the first molding surface, an opposite posterior surface defined by the second molding surface, and a lens edge defined by the sectional profile of the projected UV and/or visible beam (i.e., a spatial limitation of radiation). The radiation used for the crosslinking is radiation energy, especially UV radiation (and/or visible radiation), gamma radiation, electron radiation or thermal radiation, the radiation energy preferably being in the form of a substantially parallel beam in order on the one hand to achieve good restriction and on the other hand efficient use of the energy.

The term "modulus" or "elastic modulus" in reference to a contact lens or a material means the tensile modulus or Young's modulus which is a measure of the stiffness of a contact lens or a material. The modulus can be measured using a method in accordance with ANSI Z80.20 standard. A person skilled in the art knows well how to determine the elastic modulus of a silicone hydrogel material or a contact lens. For example, all commercial contact lenses have reported values of elastic modulus.

The intrinsic "oxygen permeability", $Dk_i$, of a material is the rate at which oxygen will pass through a material. As used in this application, the term "oxygen permeability (Dk)" in reference to a hydrogel (silicone or non-silicone) or a contact lens means a corrected oxygen permeability ($Dk_c$) which is measured at about 34-35° C. and corrected for the surface resistance to oxygen flux caused by the boundary layer effect according to the procedures described in Example 1 of U.S. patent application publication No. 2012/0026457 A1. Oxygen permeability is conventionally expressed in units of barrers, where "barrer" is defined as $[(cm^3 \text{ oxygen})(mm)/(cm^2)(sec)(mm \text{ Hg})] \times 10^{-10}$.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as $[(cm^3 \text{ oxygen})/(cm^2)(sec)(mm \text{ Hg})] \times 10^{-9}$.

"UVA" refers to radiation occurring at wavelengths between 315 and 380 nanometers; "UVB" refers to radiation occurring between 280 and 315 nanometers; "Violet" refers to radiation occurring at wavelengths between 380 and 440 nanometers.

"UVA transmittance" (or "UVA % T"), "UVB transmittance" or "UVB % T", and "violet-transmittance" or "Violet % T" are calculated by the following formula $$UVA \% T = \frac{\text{Average \% Transmission between 315 nm and 380 nm}}{\text{Luminescence \% } T} \times 100$$

$$UVB \% T = \frac{\text{Average \% Transmission between 280 nm and 315 nm}}{\text{Luminescence \% } T} \times 100$$

$$Violet \% T = \frac{\text{Average \% Transmission between 380 nm and 440 nm}}{\text{Luminescence \% } T} \times 100$$

in which Luminescence % T is determined by the following formula

Luminescence % T=Average % Transmission between 780-380 nm.

In general, the invention is directed to uses of a PC-modified polyvinyl alcohol as a leachable lubricant for soft contact lenses, as a lubricant used in an ophthalmic solution, and as a coating material for contact lenses comprising monomeric (repeating) units of an arylborono-containing vinylic monomer. The invention is partly based on the discovery that a polyvinylalcohol can be chemically modified with phosphorylcholine glyceraldehyde (PCGA) according to Scheme I.

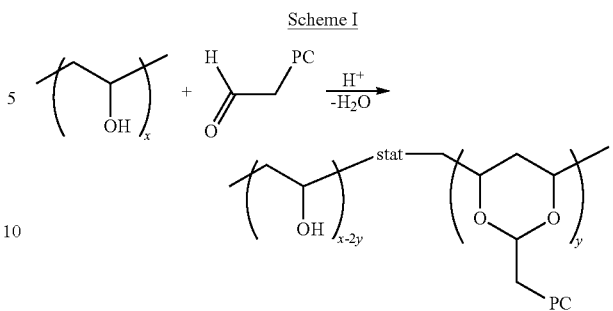

Scheme I

PC-modified polyvinylalcohols can be prepared to have a desired concentration of PC-containing monomeric units and can be purified with ultrafiltration to remove all of the residual impurities and potential side products. It is believed that by introducing PC groups into a polyvinylalcohol, the resultant chemically-modified polyvinylalcohol can impart excellent biocompatibility and lubricity to a corneal surface or a soft contact lens surface due to the biomembrane-like structure of the PC groups and can have high hydrophilicity and moisture-retaining properties due to the zwitterionic nature of the PC groups.

In one aspect, the invention provides a soft contact lens, comprising: a lens bulk material which is a crosslinked polymeric material having a polymer matrix; and at least one non-polymerizable preformed PC-containing polymer which comprises (a) first repeating units of vinyl alcohol and/or vinyl acetate and (b) second repeating units of 6-membered acetal ring substituted with a phosphorylcholine-containing group, wherein the non-polymerizable preformed PC-containing polymer is not covalently attached to the crosslinked polymeric material and is distributed within the polymer matrix.

In accordance with this aspect of the invention, a non-polymerizable preformed PC-containing polymer of the invention, which comprises (a) first repeating units and (b) second repeating units, can be prepared by reacting a polyvinylalcohol with a PC-containing aldehyde compound (preferably with phosphorylcholine glyceraldehyde).

Polyvinyl alcohol is usually prepared by hydrolysis of the corresponding homopolymeric polyvinyl acetate and can have different hydrolysis degrees. In accordance with the invention, the first repeating units of a non-polymerizable preformed PC-containing polymer of the invention can be vinyl alcohol repeating units, vinyl acetate repeating units, or combinations thereof. It is understood that the vinyl acetate repeating units of a non-polymerizable preformed PC-containing polymer of the invention can be hydrolyzed during autoclave for sterilizing a soft contact lens of the invention. It is also understood that the first repeating units of a non-polymerizable preformed PC-containing polymer of the invention can be designed to have a desired mole percentage (relative to the total amount of the first repeating units) based on its compatibility with polymerizable components in a polymerizable composition for making the lens bulk material. It is also understood that a non-polymerizable preformed PC-containing polymer of the invention can further comprises about 10% by moles or less of other repeating units.

Phosphorylcholine glyceraldehyde can be prepared by oxidative cleavage of glyceryl phosphorylchlorine (GPC), as illustrated by Scheme II, according to the procedures described in articles, e.g., by Gao et al. in Macromol Res.

(2012), 20, 1063-1069, by Lu et al. in J. Polym. Res. (2012), 19, 9959-9969, and by Miyazawa and Winnik in Macromolecules (2002), 35, 9536-9544. The used reaction conditions are mild and the reaction yields are near quantitative. The starting compound, GPC, is commercially available.

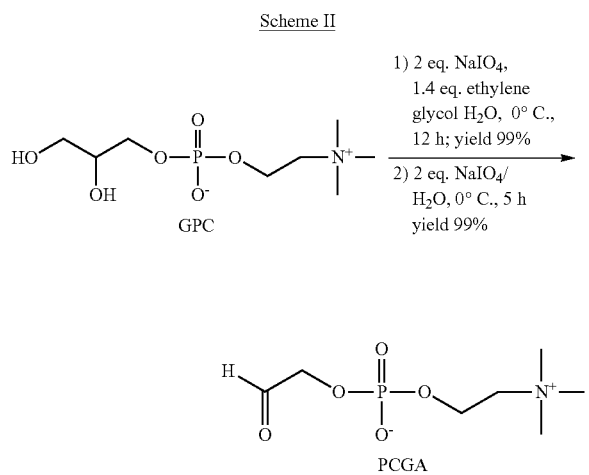 [SMILES: C[N+](C)(C)CCOP(=O)([O-])OCC(O)CO ; C[N+](C)(C)CCOP(=O)([O-])OCC=O]

Scheme II

PC-containing aldehyde compounds can also be prepared by the oxidation of PC-containing alcohols under conditions known to a person skilled in the art for converting an alcohol to aldehyde. PC-containing alcohols can be prepared according to procedures described in U.S. Pat. No. 4,721,800.

In accordance with a preferred embodiment of the invention, said at least one non-polymerizable preformed phosphorylcholine-containing polymer each comprises (a) first repeating units in an amount, designated as M1, of from about 60% to about 99% by mole (preferably from 65% to 98%, more preferably from 70% to 97%, even more preferably from 75% to 96%), wherein the first repeating units have a formula of

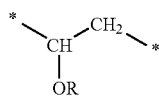

in which R is H or —C(O)CH$_3$, and (b) second repeating units in an amount, designated as M2, of from about 1% to about 40% by mole (preferably from 2% to 35%, more preferably from about 3% to 30%, even more preferably from about 4% to 25%), wherein the second repeating units have a formula of

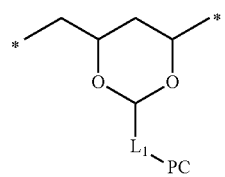

in which L$_1$ is a C$_1$-C$_6$ (preferably C$_1$) divalent alkylene radical and PC is a monovalent zwitterionic group of

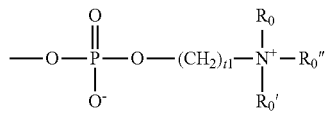

which t1 is an integer of 1 to 5 and R$_0$, R$_0$' and R$_0$" independently of one another are C$_1$-C$_4$ alkyl, provided that (M1+M2) is greater than about 90% by mole (preferably about 95% by mole, more preferably 98% by mole).

The number-average molecular weight M$_n$ of the non-polymerizable preformed phosphorylcholine-containing polymer is preferably from 10,000 to 2,000,000, more preferably from 10,000 to 1,000,000, even more preferably from 20,000 to 500,000 Daltons. They can be determined by GPC/RI method under the following conditions:

Columns: 2× Waters Ultra-Hydrogel Linear 300×7.8 mm column set
Mobile Phase: 0.2M sodium nitrate and 0.02% (w/w) sodium azide (aqueous) for multi-angle laser light scattering (MALLS)
Temperature: 25° C. MALLS
MALLS Detector: Waters Alliance e-2695 with RI/LS (Wyatt DAWN)
Flow Rate: 0.5 mL/min (nominal)
Injection Volume: 0.100 mL
Standards: poly(ethylene glycol), poly(ethylene oxide), poly (acrylamide) from American Polymer Standard Corporation; poly(saccharide) from Polymer Laboratories
Sample preparation: 90° C. for 30 min in aqueous mobile phase pre-filtered through 0.45 uM syringe filter (HT Tuffryn membrane, PALL, PN 4497T) into auto sampler vials In a preferred embodiment of the invention, the soft contact lens comprises at least two different non-polymerizable preformed PC-containing polymers one of which has a number-average molecular weight of from 10,000 to 100,000 Daltons while the other has a number-average molecular weight of from 200,000 to 2,000,000. By having different molecular weights, the two different non-polymerizable preformed PC-containing polymers can leach out of the soft contact lens at different wearing times, thereby providing the PC-containing lubricant to the eye over a long period of wearing time. The weight proportion of the lower molecular weight and higher molecular weight non-polymerizable preformed PC-containing polymers may vary within broad ranges, but is, for example, from 1:1 to 5:1, preferably from 1:1 to 4:1, and in particular from 1:1 to 3:1.

In accordance with the invention, the crosslinked polymeric material as lens bulk material of a soft contact lens of the invention can be a non-silicone hydrogel material or a silicone hydrogel material.

A person skilled in the art knows very well how to make soft contact lenses. For example, soft contact lenses can be produced in a conventional "spin-casting mold," as described for example in U.S. Pat. No. 3,408,429, or by the full cast-molding process in a static form, as described in U.S. Pat. Nos. 4,347,198; 5,508,317; 5,583,463; 5,789,464; and 5,849,810, or by lathe cutting of polymeric material buttons as used in making customized contact lenses. In cast-molding, a polymerizable composition (or lens formulation) typically is dispensed into molds and cured (i.e., polymerized and/or crosslinked) in molds for making contact lenses.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. Nos. 4,444,711; 4,460,534; 5,843,346; and 5,894,002.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In a preferred embodiment, reusable molds are used and the lens-forming composition is cured actinically under a spatial limitation of actinic radiation to form a contact lens. Examples of preferred reusable molds are those disclosed in U.S. Pat. Nos. 6,627,124, 6,800,225, 7,384,590, and 7,387,759. Reusable molds can be made of quartz, glass, sapphire, CaF$_2$, a cyclic olefin copolymer (e.g., Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky.), polymethylmethacrylate (PMMA), polyoxymethylene from DuPont (Delrin), Ultem® (polyetherimide) from G.E. Plastics, PrimoSpire®, etc.

Preferably, a reusable mold suitable for spatial limitation of radiation is used in the invention, the projected beam of radiation (e.g., radiation from the light source including the light in the region of 360 nm to 550 nm) limits radiation (e.g., UV radiation) impinging on the mixture of the lens-forming materials located in the path of the projected beam from the first molding surface to the second molding surface of the reusable mold. The resultant contact lens comprises an anterior surface defined by the first molding surface, an opposite posterior surface defined by the second molding surface, and a lens edge (with sharp edge and high quality) defined by the sectional profile of the projected radiation beam (i.e., a spatial limitation of radiation). Examples of reusable molds suitable for spatial limitation of radiation include without limitation those disclosed in U.S. Pat. Nos. 6,627,124, 6,800,225, 7,384,590, and 7,387,759.

For example, a preferred reusable mold comprises a first mold half having a first molding surface and a second mold half having a second molding surface. The two mold halves of the preferred reusable mold are not touching each other, but there is a thin gap of annular design arranged between the two mold halves. The gap is connected to the mold cavity formed between the first and second molding surfaces, so that excess mixture can flow into the gap. It is understood that gaps with any design can be used in the invention.

The reusable mold preferably comprises a mask which is fixed, constructed or arranged in, at or on the mold half having the radiation-permeable molding surface. The mask is impermeable or at least of poor permeability compared with the permeability of the radiation-permeable molding surface. The mask extends inwardly right up to the mold cavity and surrounds the mold cavity so as to screen all areas behind the mask with the exception of the mold cavity.

The mask may preferably be a thin chromium layer, which can be produced according to processes as known, for example, in photo and UV lithography. Other metals or metal oxides may also be suitable mask materials. The mask can also be coated with a protective layer, for example of silicon dioxide if the material used for the mold or mold half is quartz.

Alternatively, the mask can be a masking collar made of a material comprising a UV/visible light-absorber and substantially blocks curing energy therethrough as described in U.S. Pat. No. 7,387,759. In this preferred embodiment, the mold half with the mask comprises a generally circular disc-shaped transmissive portion and a masking collar having an inner diameter adapted to fit in close engagement with the transmissive portion, wherein said transmissive portion is made from an optically clear material and allows passage of curing energy therethrough, and wherein the masking collar is made from a material comprising a light-blocker and substantially blocks passage of curing energy therethrough, wherein the masking collar generally resembles a washer or a doughnut, with a center hole for receiving the transmissive portion, wherein the transmissive portion is pressed into the center opening of the masking collar and the masking collar is mounted within a bushing sleeve.

In accordance with the invention, the polymerizable composition can be introduced (dispensed) into a cavity formed by a mold according to any known methods.

After the polymerizable composition is dispensed into the mold, it is polymerized to produce a contact lens. Polymerizing may be initiated thermally or actinically, preferably by exposing the polymerizable composition in the mold to a spatial limitation of actinic radiation to polymerize the polymerizable components in the polymerizable composition.

Opening of the mold so that the molded contact lens can be removed from the mold may take place in a manner known per se.

The molded contact lens can be subject to lens extraction to remove unpolymerized polymerizable components. The extraction solvent can be any solvent known to a person skilled in the art. Examples of suitable extraction solvent are those described below.

Non-silicone hydrogel contact lenses of the invention can be produced from a polymerizable composition obtained by adding a non-polymerizable preformed PC-containing polymer of the invention into a lens formulation for making commercial non-silicone hydrogel contact lenses according to any known methods. For example, for production of non-silicone hydrogel contact lenses, a non-silicone hydrogel lens formulation for cast-molding or spin-cast molding or for making rods used in lathe-cutting of contact lenses typically is: either (1) a monomer mixture comprising (a) a non-polymerizable preformed PC-containing polymer of the invention, (b) at least one hydrophilic vinylic monomer (e.g., hydroxyethyl methacrylate, glycerol methacrylate, N-vinylpyrrolidone, or combinations thereof), (c) at least one component selected from the group consisting of a crosslinking agent, a hydrophobic vinylic monomer, a free-radical initiator (photoinitiator or thermal initiator), a UV-absorbing vinylic monomer, a high-energy-violet-light ("HEVL") absorbing vinylic monomer, a visibility tinting agent (e.g., reactive dyes, polymerizable dyes, pigments, or mixtures thereof), antimicrobial agents (e.g., preferably silver nanoparticles), a bioactive agent, and combinations thereof; or (2) an aqueous solution comprising (a) a non-polymerizable preformed PC-containing polymer of the invention, (b) one or more water-soluble prepolymers, and (c) at least one component selected from the group consisting of hydrophilic vinylic monomer, a crosslinking agent, a hydrophobic vinylic monomer, a free-radical initiator (photoinitiator or thermal initiator), a UV-absorbing vinylic monomer, a HEVL absorbing vinylic monomer, a visibility tinting agent (e.g., reactive dyes, polymerizable dyes, pigments, or mixtures thereof), antimicrobial agents (e.g., preferably silver nanoparticles), a bioactive agent, and combinations thereof. Resultant hydrogel contact lenses then can be subjected to extraction with an extraction solvent to remove unpolymerized components from the resultant lenses and to hydration process, as known by a person skilled in the art.

Examples of water-soluble prepolymers include without limitation: a water-soluble polymerizable poly(vinyl alcohol) prepolymer described in U.S. Pat. Nos. 5,583,163 and 6,303,687; a water-soluble vinyl group-terminated polyurethane prepolymer described in U.S. Pat. No. 6,995,192; derivatives of a polyvinyl alcohol, polyethyleneimine or polyvinylamine, which are disclosed in U.S. Pat. No. 5,849,841; a water-soluble polymerizable polyurea prepolymer described in U.S. Pat. Nos. 6,479,587 and 7,977,430; polymerizable polyacrylamide; polymerizable statistical copolymers of vinyl lactam, MMA and a comonomer, which are disclosed in U.S. Pat. No. 5,712,356; polymerizable copolymers of vinyl lactam, vinyl acetate and vinyl alcohol, which are disclosed in U.S. Pat. No. 5,665,840; polyether-polyester copolymers with polymerizable side chains which are disclosed in U.S. Pat. No. 6,492,478; branched polyalkylene glycol-urethane prepolymers disclosed in U.S. Pat. No. 6,165,408; polyalkylene glycol-tetra(meth)acrylate prepolymers disclosed in U.S. Pat. No. 6,221,303; polymerizable polyallylamine gluconolactone prepolymers disclosed in U.S. Pat. No. 6,472,489.

Numerous non-silicone hydrogel lens formulations have been described in numerous patents and patent applications published by the filing date of this application and have been used in producing commercial non-silicone hydrogel contact lenses. Examples of commercial non-silicone hydrogel contact lenses include, without limitation, alfafilcon A, acofilcon A, deltafilcon A, etafilcon A, focofilcon A, helfilcon A, helfilcon B, hilafilcon B, hioxifilcon A, hioxifilcon B, hioxifilcon D, methafilcon A, methafilcon B, nelfilcon A, nesofilcon A, ocufilcon A, ocufilcon B, ocufilcon C, ocufilcon D, omafilcon A, phemfilcon A, polymacon, samfilcon A, telfilcon A, tetrafilcon A, and vifilcon A.

In a preferred embodiment, the crosslinked polymeric material as lens bulk material of a soft contact lens of the invention is composed of a non-silicone hydrogel material which comprises at least 50% by mole of repeating units of at least one hydroxyl-containing vinylic monomer, preferably selected from the group consisting of hydroxyethyl (meth)acrylate, glycerol (meth)acrylate, 3-hydroxypropyl (meth)acrylate, 2-hydroxypropyl (meth)acrylate, 3-amino-2-hydroxypropyl (meth)acrylate, N-2-hydroxyethyl (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, allyl alcohol, and combinations thereof, more preferably selected from the group consisting of hydroxyethyl (meth)acrylate and glycerol (meth)acrylate. The mole percentages of repeating units can be calculated based on a non-silicone hydrogel lens formulation for making the non-silicone hydrogel contact lens.

In another preferred embodiment, the crosslinked polymeric material as lens bulk material of a soft contact lens of the invention is a non-silicone hydrogel material comprising at least 50% by mole (preferably at least 60% by mole, more preferably at least 70% by mole, even more preferably at least 75% by mole of repeating units of vinyl alcohol. More preferably the non-silicone hydrogel material is a crosslinking product of at least one water-soluble actinically-polymerizable polyvinyl alcohol prepolymer in the presence or absence of a vinylic monomer and/or vinylic crosslinking agent, wherein the water-soluble actinically-polymerizable polyvinyl alcohol prepolymer comprises:

repeating vinyl alcohol units of

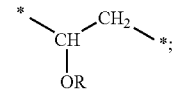

and
repeating crosslinking units of formula (I);

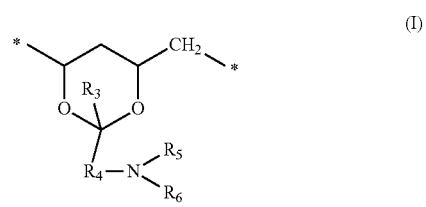

$R_3$ can be hydrogen or a $C_1$-$C_6$ alkyl group (preferably hydrogen);
$R_4$ is a $C_1$-$C_6$ alkylene divalent radical (preferably a $C_1$-$C_4$ alkylene divalent radical, more preferably methylene or butylene divalent radical, even more preferably methylene divalent radical);
$R_5$ is hydrogen or $C_1$-$C_6$ alkyl (preferably hydrogen or $C_1$-$C_4$ alkyl, more preferably hydrogen or methyl or ethyl, even more preferably hydrogen or methyl);
$R_6$ is an ethylenically unsaturated group of

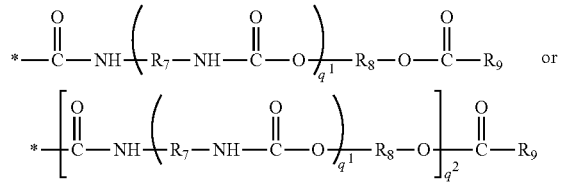

in which q1 and q2 independently of each another are zero or one, and $R_7$ and $R_8$ independently of one another are a $C_2$-$C_8$ alkylene divalent radical, $R_9$ is $C_2$-$C_8$ alkenyl. Preferably, $R_3$ is H, $R_4$ is methylene divalent radical, $R_5$ is H or $C_1$-$C_4$ alkyl, $R_6$ is a radical of

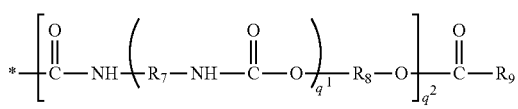

in which q2 is zero, $R_9$ is vinyl (*—CH=CH$_2$) or 1-methylethenyl (*—C(CH$_3$)=CH$_2$). More preferably, the polyvinylalcohol prepolymer has a number average molecular weight of at least about 2,000 Daltons, and comprises from about 1% to about 25% by mole, preferably from about 2% to about 15% by mole of the repeating units of formula (I).

In a preferred embodiment, the water-soluble actinically-polymerizable polyvinyl alcohol prepolymer further comprises repeating units of formula (II)

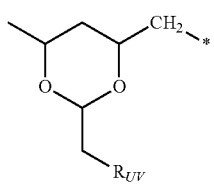

in which $R_{UV}$ is a monovalent radical of any one of formula (III)-(VII)

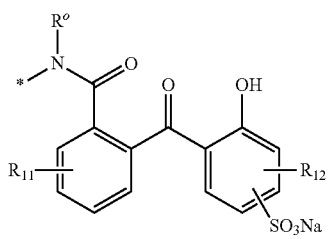

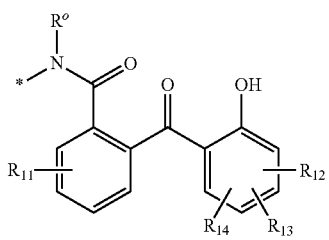

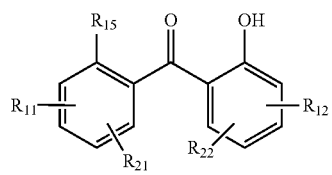

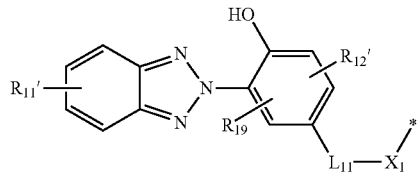

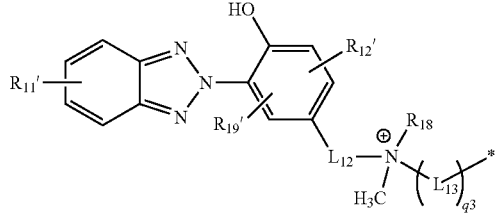

in which:
$R^o$ is H or CH$_3$;
$R_{11}$, $R_{12}$ and $R_{12}'$ independent of one other are H, CH$_3$, CCl$_3$, CF$_3$, Cl, Br, NR'R" in which
R' and R" independent of each other are H or C$_1$-C$_4$ alkyl, OH, or OCH$_3$;
$R_{11}'$ independent of each other are H, CH$_3$, CCl$_3$, CF$_3$, Cl, Br, NR'R" in which R' and R" independent of each other are H or C$_1$-C$_4$ alkyl, OH, OCH$_3$, SO$_3$H, or SO$_3^-$Na$^+$;
$R_{13}$ and $R_{14}$ independent of each other are H or a first hydrophilic group which is

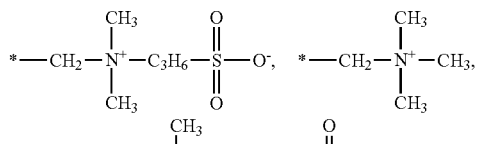

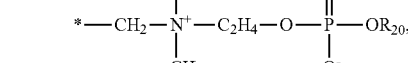

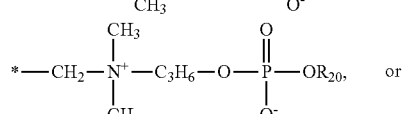

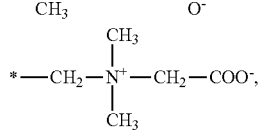

provided that at least one of $R_{13}$ and $R_{14}$ is the first hydrophilic group;
q3 is zero or 1;
n1 is an integer of 2 to 20 (preferably 3 to 15, more preferably 4 to 10);
$R_{15}$ is H, *—COOH, *—CONH—C$_2$H$_4$—(OC$_2$H$_4$)$_{n1}$—OCH$_3$, or *—CONH—C$_2$H$_4$—(OC$_2$H$_4$)$_{n1}$—OH; one of $R_{16}$ and $R_{17}$ is H or a second hydrophilic group which is

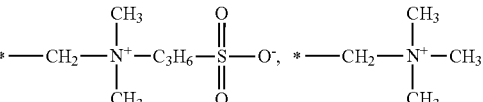

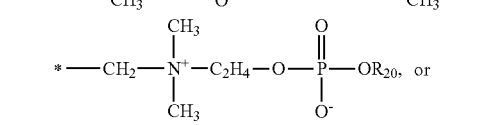

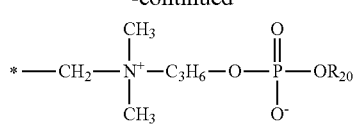
while the other of $R_{16}$ and $R_{17}$ is
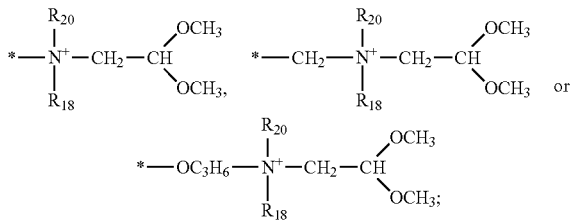
$R_{18}$ is $CH_3$, $C_2H_5$,
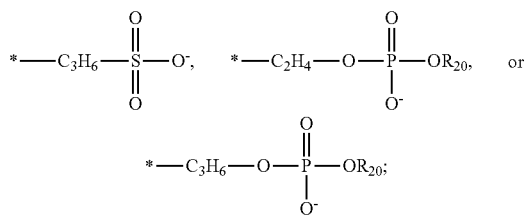
$R_{19}$ is $SO_3Na$,
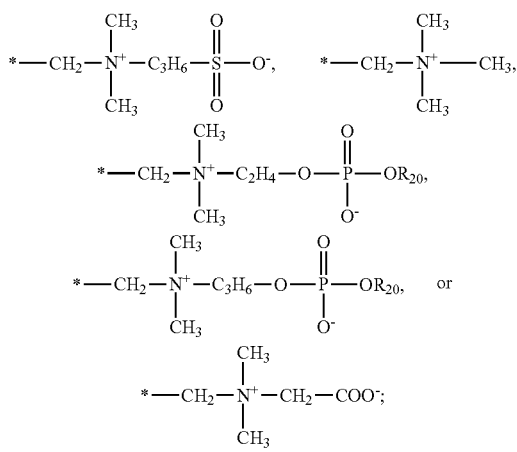
$R_{19}'$ is H, $SO_3Na$,
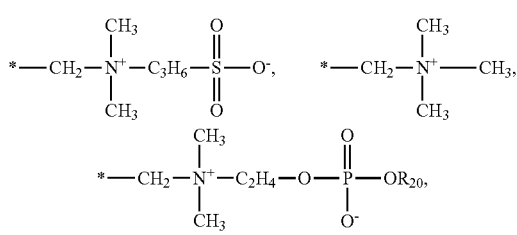
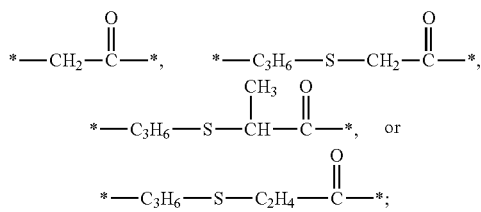
$R_{20}$ is methyl or ethyl;
$L_{11}$ is a linkage of
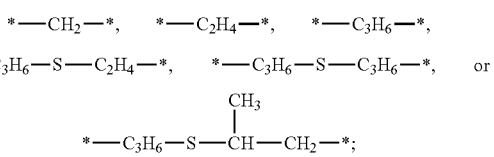
$L_{12}$ is a linkage of
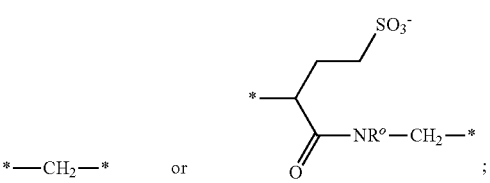
$L_{13}$ is a linkage of
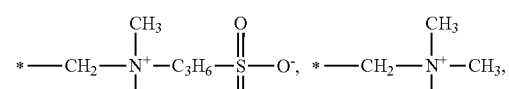
X1 is O or $NR^o$;
one of $R_{21}$ and $R_{22}$ is H or a second hydrophilic group which is
is
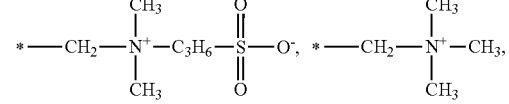
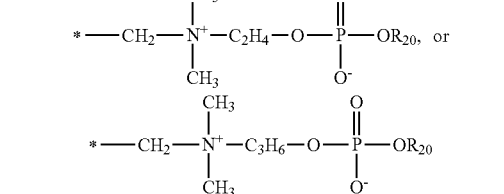

while the other of $R_{21}$ and $R_{22}$ is a divalent radical of

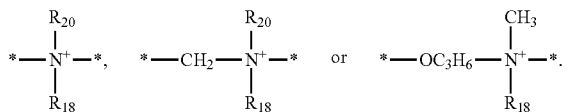

A water-soluble, actinically-polymerizable polyvinylalcohol prepolymer can be prepared using techniques known in the art, e.g., those disclosed in U.S. Pat. Nos. 5,583,163 and 6,303,687 and U.S. Pat. Appl. Pub. No. 2017/0158611A1.

Preferably, the polyvinylalcohol prepolymers are purified in a manner known per se, for example by precipitation with organic solvents, such as acetone, filtration and washing, extraction in a suitable solvent, dialysis or ultrafiltration, ultra-filtration being especially preferred. By means of that purification process the prepolymers can be obtained in extremely pure form, for example in the form of concentrated aqueous solutions that are free, or at least substantially free, from reaction products, such as salts, and from starting materials, such as, for example, non-polymeric constituents.

The preferred purification process for the prepolymers used in the process according to the invention, ultrafiltration, can be carried out in a manner known per se. It is possible for the ultrafiltration to be carried out repeatedly, for example from two to ten times. Alternatively, the ultrafiltration can be carried out continuously until the selected degree of purity is attained. The selected degree of purity can in principle be as high as desired. A suitable measure for the degree of purity is, for example, the concentration of dissolved salts obtained as by-products, which can be determined simply in known manner.

It would be advantageous that the water-soluble actinically-polymerizable polyvinylalcohol prepolymers are in a substantially pure form (e.g., purified by ultrafiltration to remove most reactants for forming the prepolymer). Therefore, after crosslinking by actinic radiation, a contact lens may require practically no more subsequent purification, such as in particular complicated extraction of unpolymerized constituents. Furthermore, crosslinking may take place in aqueous solution, so that a subsequent solvent exchange or the hydration step is not necessary.

Preferably, a polyvinylalcohol-based hydrogel contact lens is obtained by: introducing an aqueous lens-forming composition including a water-soluble, actinically-polymerizable polyvinyl alcohol prepolymer described above and a non-polymerizable preformed PC-containing polymer of the invention into a reusable mold and curing under a spatial limitation of actinic radiation the aqueous lens-forming composition.

In a further preferred embodiment, the crosslinked polymeric material as lens bulk material of a soft contact lens of the invention is a silicone hydrogel material which comprises (a) repeating units of at least one silicone-containing vinylic monomer and/or at least one silicone-containing vinylic crosslinker and (b) repeating units of at least one one hydrophilic vinylic monomer.

In accordance with the invention, a silicone-containing vinylic monomer can be any silicone-containing vinylic monomer known to a person skilled in the art. Examples of preferred silicone-containing vinylic monomers include without limitation vinylic monomers each having a bis(trialkylsilyloxy)alkylsilyl group or a tris(trialkylsilyloxy) silyl group, polysiloxane vinylic monomers, 3-methacryloxy propylpentamethyldisiloxane, t-butyldimethyl-siloxyethyl vinyl carbonate, trimethylsilylethyl vinyl carbonate, and trimethylsilylmethyl vinyl carbonate, and combinations thereof.

Examples of preferred vinylic monomers each having a bis(trialkylsilyloxy)alkylsilyl group or a tris(trialkylsilyloxy)silyl group include without limitation tris(trimethylsilyloxy)-silylpropyl (meth)acrylate, [3-(meth)acryloxy-2-hydroxypropyloxy]propylbis(trimethylsiloxy)-methylsilane, [3-(meth)acryloxy-2-hydroxypropyloxy]propylbis(trimethylsiloxy)butylsilane, 3-(meth)acryloxy-2-(2-hydroxyethoxy)-propyloxy) propylbis(trimethylsiloxy)methylsilane, 3-(meth)acryloxy-2-hydroxypropyloxy) propyltris(trimethylsiloxy)silane, N-[tris(trimethylsiloxy)-silylpropyl]-(meth) acrylamide, N-(2-hydroxy-3-(3-(bis(trimethylsilyloxy) methylsilyl)propyloxy)-propyl)-2-methyl (meth) acrylamide, N-(2-hydroxy-3-(3-(bis(trimethylsilyloxy) methylsilyl)-propyloxy)propyl) (meth)acrylamide, N-(2-hydroxy-3-(3-(tris(trimethylsilyloxy)silyl)propyloxy)-propyl)-2-methyl acrylamide, N-(2-hydroxy-3-(3-(tris (trimethylsilyloxy)silyl)propyloxy)propyl) (meth) acrylamide, N-[tris(dimethylpropylsiloxy)silylpropyl]-(meth)acrylamide, N-[tris(dimethylphenylsiloxy) silylpropyl] (meth)acrylamide, N-[tris(dimethylethylsiloxy) silylpropyl](meth)acrylamide, N,N-bis[2-hydroxy-3-(3-(bis (trimethylsilyloxy)methylsilyl)propyloxy)propyl]-2-methyl (meth)acrylamide, N,N-bis[2-hydroxy-3-(3-(bis(trimethylsilyloxy)methylsilyl)-propyloxy)propyl] (meth)acrylamide, N,N-bis[2-hydroxy-3-(3-(tris(trimethylsilyloxy)silyl)-propyloxy)propyl]-2-methyl (meth)acrylamide, N,N-bis[2-hydroxy-3-(3-(tris(trimethylsilyloxy)-silyl) propyloxy)propyl] (meth)acrylamide, N-[2-hydroxy-3-(3-(t-butyldimethylsilyl)propyloxy)-propyl]-2-methyl (meth)acrylamide, N-[2-hydroxy-3-(3-(t-butyldimethylsilyl)propyloxy)propyl] (meth)acrylamide, N,N-bis[2-hydroxy-3-(3-(t-butyldimethylsilyl)propyloxy) propyl]-2-methyl (meth) acrylamide, N-2-(meth)acryloxyethyl-O-(methyl-bis-trimethylsiloxy-3-propyl)silyl carbamate, 3-(trimethylsilyl) propylvinyl carbonate, 3-(vinyloxycarbonylthio)propyl-tris (trimethyl-siloxy)silane, 3-[tris(trimethylsiloxy)silyl] propylvinyl carbamate, 3-[tris(trimethylsiloxy)silyl] propyl allyl carbamate, 3-[tris(trimethylsiloxy)silyl]propyl vinyl carbonate, those disclosed in U.S. Pat. Nos. 9,097,840, 9,103,965 and 9,475,827, and mixtures thereof. The above preferred silicone-containing vinylic monomers can be obtained from commercial suppliers or can be prepared according to procedures described in U.S. Pat. Nos. 7,214, 809, 8,475,529, 8,658,748, 9,097,840, 9,103,965, and 9,475, 827.

Examples of preferred polysiloxane vinylic monomers include without limitation mono-(meth)acryloyl-terminated, monoalkyl-terminated polysiloxanes of formula (I) include without limitation α-(meth)acryloxypropyl terminated ω-butyl (or ω-methyl) terminated polydimethylsiloxane, α-(meth)acryloxy-2-hydroxypropyloxypropyl terminated ω-butyl (or ω-methyl) terminated polydimethylsiloxane, α-(2-hydroxyl-methacryloxypropyloxypropyl)-ω-butyl-decamethylpentasiloxane, α-[3-(meth)acryloxyethoxy-2-hydroxypropyloxypropyl]-terminated ω-butyl (or ω-methyl) terminated polydimethylsiloxane, α-[3-(meth)acryloxy-propyloxy-2-hydroxypropyloxypropyl]-terminated ω-butyl (or ω-methyl) terminated polydimethylsiloxane, α-[3-(meth) acryloxyisopropyloxy-2-hydroxypropyloxypropyl]-terminated ω-butyl (or ω-methyl) terminated polydimethylsiloxane, α-[3-(meth)acryloxybutyloxy-2-hydroxypropyloxypropyl]-terminated ω-butyl (or ω-methyl) terminated polydimethylsiloxane, α-[3-(meth)acryloxyethylamino-2-hydroxypropyloxypropyl]-terminated ω-butyl (or ω-methyl) terminated polydimethylsiloxane, α-[3-(meth)acryloxypropylamino-2-hydroxypropyloxypropyl]-terminated ω-butyl (or ω-methyl) terminated polydimethylsiloxane, α-[3-(meth)acryloxy-butylamino-2-hydroxypropyloxypropyl]-terminated ω-butyl (or ω-methyl) terminated polydimethylsiloxane, α-(meth)acryloxy(polyethylenoxy)-2-hydroxypropyloxypropyl]-terminated ω-butyl (or ω-methyl) terminated polydimethylsiloxane, α-[(meth)acryloxy-2-hydroxypropyloxy-ethoxypropyl]-terminated ω-butyl (or ω-methyl) terminated polydimethylsiloxane, α-[(meth)acryloxy-2-hydroxypropyl-N-ethylaminopropyl]-terminated ω-butyl (or ω-methyl) terminated polydimethylsiloxane, α-[(meth)acryloxy-2-hydroxypropyl-aminopropyl]-terminated ω-butyl (or ω-methyl) terminated polydimethylsiloxane, α-[(meth)acryloxy-2-hydroxypropyloxy-(polyethylenoxy) propyl]-terminated ω-butyl (or ω-methyl) terminated polydimethylsiloxane, α-(meth)acryloylamidopropyloxypropyl terminated ω-butyl (or ω-methyl) terminated polydimethylsiloxane, α-N-methyl-(meth)acryloylamidopropyloxypropyl terminated ω-butyl (or ω-methyl) terminated polydimethylsiloxane, α-[3-(meth)acrylamidoethoxy-2-hydroxypropyloxy-propyl]-terminated ω-butyl (or ω-methyl) polydimethylsiloxane, α-[3-(meth)acrylamidopropyloxy-2-hydroxypropyloxypropyl]-terminated ω-butyl (or ω-methyl) terminated polydimethylsiloxane, α-[3-(meth)acrylamidoisopropyloxy-2-hydroxypropyloxypropyl]-terminated ω-butyl (or ω-methyl) terminated polydimethylsiloxane, α-[3-(meth)acrylamidobutyloxy-2-hydroxypropyloxypropyl]-terminated ω-butyl (or ω-methyl) terminated polydimethylsiloxane, α-[3-(meth)acryloylamido-2-hydroxypropyloxypropyl] terminated ω-butyl (or ω-methyl) polydimethylsiloxane, α-[3-[N-methyl-(meth)acryloylamido]-2-hydroxypropyloxypropyl] terminated ω-butyl (or ω-methyl) terminated polydimethylsiloxane, N-methyl-N'-(propyltetra(dimethylsiloxy)-dimethylbutylsilane) (meth)acrylamide, N-(2,3-dihydroxypropane)-N'-(propyltetra(dimethylsiloxy)dimethylbutylsilane) (meth)acrylamide, (meth)acryloylamidopropyltetra(dimethylsiloxy)dimethylbutylsilane, mono-vinyl carbonate-terminated mono-alkyl-terminated polydimethylsiloxanes, mono-vinyl carbamate-terminated mono-alkyl-terminated polydimethylsiloxane, those disclosed in U.S. Pat. Nos. 9,097,840 and 9,103,965, and mixtures thereof. The above preferred polysiloxanes vinylic monomers can be obtained from commercial suppliers (e.g., Shin-Etsu, Gelest, etc.) or prepared according to procedures described in patents, e.g., U.S. Pat. Nos. 6,867,245, 8,415,405, 8,475,529, 8,614,261, and 9,217,813, or by reacting a hydroxyalkyl (meth)acrylate or (meth)acrylamide or a (meth)acryloxypolyethylene glycol with a mono-epoxy-propyloxypropyl-terminated polydimethylsiloxane, by reacting glycidyl (meth)acrylate with a mono-carbinol-terminated polydimethylsiloxane, a mono-aminopropyl-terminated polydimethylsiloxane, or a mono-ethylaminopropyl-terminated polydimethylsiloxane, or by reacting isocyanatoethyl (meth)acrylate with a mono-carbinol-terminated polydimethylsiloxane according to coupling reactions well known to a person skilled in the art.

Examples of preferred silicone-containing vinylic crosslinkers include without limitation polysiloxane vinylic crosslinkers. Examples of preferred polysiloxane vinylic crosslinkers are di-(meth)acryloyl-terminated polydimethylsiloxanes; di-vinyl carbonate-terminated polydimethylsiloxanes; di-vinyl carbamate-terminated polydimethylsiloxane; N,N,N',N'-tetrakis(3-methacryloxy-2-hydroxypropyl)-alpha,omega-bis-3-aminopropyl-polydimethylsiloxane; polysiloxane-containing macromer selected from the group consisting of Macromer A, Macromer B, Macromer C, and Macromer D described in U.S. Pat. No. 5,760,100; polysiloxane-containing macromers disclosed in U.S. Pat. Nos. 4,136,250, 4,153,641,4182822, 4189546, 4343927, 4254248, 4355147, 4276402, 4327203, 4341889, 4486577, 4543398, 4605712, 4661575, 4684538, 4703097, 4833218, 4837289, 4954586, 4954587, 5010141, 5034461, 5070170, 5079319, 5039761, 5346946, 5358995, 5387632, 5416132, 5451617, 5486579, 5962548, 5981675, 6039913, and 6762264; polysiloxane-containing macromers disclosed in U.S. Pat. Nos. 4,259,467, 4,260,725, and 4,261,875.

Examples of preferred di-(meth)acryloyloxy-terminated polysiloxane vinylic crosslinkers includes without limitation the reaction products of glycidyl methacrylate with di-amino-terminated polydimethylsiloxanes; the reaction products of glycidyl methacrylate with di-hydroxyl-terminatedd polydimethylsiloxanes; the reaction products of isocyantoethyl (meth)acrylate with di-hydroxyl-terminated polydimethylsiloxanes; di-(meth)acryloyloxy-terminated polysiloxane vinylic crosslinkers each having hydrophilized siloxane units each having one methyl substituent and one monovalent $C_4$-$C_{40}$ organic radical substituent having 2 to 6 hydroxyl groups as disclosed in U.S. Pat. No. 10,081,697; chain-extended polysiloxane vinylic crosslinkers disclosed in US201008843A1 and US20120088844A1; chain-extended polysiloxane vinylic crosslinkers described in U.S. Pat. Nos. 5,034,461, 5,416,132, 5,449,729, 5,760,100, 7,423,074, and 8,529,057; chain-extended polysiloxane vinylic crosslinkers described in U.S. Pat. App. Pub. No. 2018-0100053; chain-extended polysiloxane vinylic crosslinkers described in U.S. Pat. App. Pub. No. 2018-0100038; chain-extended polysiloxane vinylic crosslinkers described in U.S. Pat. No. 8,993,651; α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth)acryloxy-propyloxy-2-hydroxypropyloxypropyl]-terminated polydimethylsiloxane, α,ω-bis[3-(meth)acryloxy-isopropyloxy-2-hydroxypropyloxypropyl]-terminated polydimethylsiloxane, a, ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxypropyl]-terminated polydimethylsiloxane, α,ω-bis[3-(meth)acrylamidopropyloxy-2-hydroxypropyloxy-propyl]-terminated polydimethylsiloxane, α,ω-bis[3-(meth)acrylamidoisopropyloxy-2-hydroxypropyloxypropyl]-terminated polydimethylsiloxane, α,ω-bis[3-(meth)acrylamide-butyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxypropyl]-terminated polydimethylsiloxane, α,ω-bis[(meth)acrylamidoethylamino-2-hydroxypropyloxy-propyl]-terminated polydimethylsiloxane, α,ω-bis[3-(meth)acrylamidopropylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis[(meth)acryloxy-2-hydroxypropyloxy-(polyethylenoxy) propyl]-terminated polydimethylsiloxane, α,ω-bis[(meth)acryloxyethylamino-carbonyloxy-ethoxypropyl]-terminated polydimethylsiloxane, α,ω-bis[(meth)acryloxyethylamino-carbonyloxy-(polyethylenoxy)propyl]-terminated polydimethylsiloxane.

Examples of preferred hydrophilic vinylic monomers are alkyl (meth)acrylamides (as described below), hydroxyl-containing acrylic monomers (as described below), amino-containing acrylic monomers (as described below), carboxyl-containing acrylic monomers (as described below), N-vinyl amide monomers (as described below), methylene-containing pyrrolidone monomers (i.e., pyrrolidone derivatives each having a methylene group connected to the pyrrolidone ring at 3- or 5-position) (as described below), acrylic monomers having a $C_1$-$C_4$ alkoxyethoxy group (as described below), vinyl ether monomers (as described below), allyl ether monomers (as described below), phosphorylcholine-containing vinylic monomers (as described below), N-2-hydroxyethyl vinyl carbamate, N-carboxyvinyl-β-alanine (VINAL), N-carboxyvinyl-α-alanine, and combinations thereof.

Examples of alkyl (meth)acrylamides includes without limitation (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof.

Examples of hydroxyl-containing acrylic monomers include without limitation N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol) ethyl (meth)acrylamide having a number average molecular weight of up to 1500, and combinations thereof.

Examples of amino-containing acrylic monomers include without limitation N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, and combinations thereof.

Examples of carboxyl-containing acrylic monomers include without limitation 2-(meth)acrylamidoglycolic acid, (meth)acrylic acid, ethylacrylic acid, and combinations thereof.

Examples of preferred N-vinyl amide monomers include without limitation N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof. Preferably, the N-vinyl amide monomer is N-vinylpyrrolidone, N-vinyl-N-methyl acetamide, or combinations thereof.

Examples of preferred methylene-containing ($=CH_2$) pyrrolidone monomers include without limitations 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof.

Examples of preferred acrylic monomers having a $C_1$-$C_4$ alkoxyethoxy group include without limitation ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a number average molecular weight of up to 1500, methoxy-poly(ethylene glycol)ethyl (meth)acrylamide having a number average molecular weight of up to 1500, and combinations thereof.

Examples of preferred vinyl ether monomers include without limitation ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof.

Examples of preferred allyl ether monomers include without limitation allyl alcohol, ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof.

Examples of preferred phosphorylcholine-containing vinylic monomers include without limitation (meth)acryloyloxyethyl phosphorylcholine (aka, MPC, or 2-((meth)acryloyloxy)ethyl-2'-(trimethylammonio)ethylphosphate), 3-((meth)acryloyloxy) propyl-2'-(trimethylammonio)ethylphosphate), 4-((meth)acryloyloxy) butyl-2'-(trimethylammonio)-ethylphosphate, 2-[(meth)acryloylamino]ethyl-2'-(trimethylammonio)-ethylphosphate, 3-[(meth)acryloylamino]propyl-2-(trimethylammonio) ethylphosphate, 4-[(meth)acryloylamino]butyl-2'-

(trimethylammonio)ethylphosphate, 5-((meth)acryloyloxy)-pentyl-2'-(trimethylammonio)ethyl phosphate, 6-((meth)acryloyloxy)hexyl-2'-(trimethylammonio)ethylphosphate, 2-((meth)acryloyloxy)ethyl-2'-(triethylammonio)ethylphosphate, 2-((meth)acryloyloxy)ethyl-2'-(tripropylammonio) ethylphosphate, 2-((meth)acryloyloxy)ethyl-2'-(tributylammonio)ethyl phosphate, 2-((meth)acryloyoxy)propyl-2'-(trimethylammonio)-ethylphosphate, 2-((meth)acryloyloxy)butyl-2'-(trimethylammonio)-ethylphosphate, 2-((meth)acryloyloxy)pentyl-2'-(trimethylammonio)ethylphosphate, 2-((meth)acryloyloxy)hexyl-2'-(trimethylammonio)ethyl phosphate, 2-(vinyloxy)ethyl-2'-(trimethylammonio)ethylphosphate, 2-(allyloxy)ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio)ethylphosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof.

In accordance with the invention, the silicone hydrogel material can further comprises repeating units of one or more of a hydrophobic vinylic monomer and a non-silicone vinylic crosslinker.

Examples of preferred hydrophobic vinylic monomers include methyl (meth)acrylate, ethyl (meth)acrylate, propyl (meth)acrylate, isopropyl (meth)acrylate, cyclohexyl (meth)acrylate, 2-ethylhexyl (meth)acrylate, vinyl acetate, vinyl propionate, vinyl butyrate, vinyl valerate, styrene, chloroprene, vinyl chloride, vinylidene chloride, (meth)acrylonitrile, 1-butene, butadiene, vinyl toluene, vinyl ethyl ether, perfluorohexylethyl-thio-carbonyl-aminoethyl-methacrylate, isobornyl (meth)acrylate, trifluoroethyl (meth)acrylate, hexafluoro-isopropyl (meth)acrylate, hexafluorobutyl (meth)acrylate, and combinations thereof.

Examples of preferred non-silicone vinylic cross-linking agents include without limitation ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth)acryloxyethyl] phosphate, trimethylolpropane di-(meth)acrylate, and 3,4-bis[(meth)acryloyl]tetrahydrofuan, diacrylamide, dimethacrylamide, N,N-di(meth)acryloyl-N-methylamine, N,N-di(meth)acryloyl-N-ethylamine, N,N'-methylene bis(meth)acrylamide, N,N'-ethylene bis(meth)acrylamide, N,N-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate, piperazine diacrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, allylmethacrylate, allylacrylate, N-allyl-methacrylamide, N-allyl-acrylamide, and combinations thereof. A preferred non-silicone vinylic cross-linking agent is tetra(ethyleneglycol) di-(meth)acrylate, tri(ethyleneglycol) di-(meth)acrylate, ethyleneglycol di-(meth)acrylate, di(ethyleneglycol) di-(meth)acrylate, tetraethyleneglycol divinyl ether, triethyleneglycol divinyl ether, diethyleneglycol divinyl ether, ethyleneglycol divinyl ether, triallyl isocyanurate, triallyl cyanurate, and combinations thereof.

In accordance with the invention, the lens bulk material of a soft contact lens of the invention can further comprises repeating units of a UV-absorbing vinylic monomer and preferably a HEVL-absorbing vinylic monomer in which HEVL stands for high energy violet light (i.e., light having wavelength between 380 nm and 440 nm). The term "UV-absorbing vinylic monomer" refers to a vinylic monomer that can absorb UV light; and the term "UV/HEVL-absorbing vinylic monomer" refers to a vinylic monomer that can absorb high-energy-violet-light.

Any suitable UV-absorbing vinylic monomers and HEVL-absorbing vinylic monomers can be used in a polymerizable composition for preparing a preformed SiHy contact lens of the invention. Examples of preferred UV-absorbing and HEVL-absorbing vinylic monomers include without limitation: 2-(2-hydroxy-5-vinylphenyl)-2H-benzotriazole, 2-(2-hydroxy-5-acrylyloxyphenyl)-2H-benzotriazole, 2-(2-hydroxy-3-methacrylamido methyl-5-tert octylphenyl) benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxypropylphenyl) benzotriazole, 2-hydroxy-5-methoxy-3-(5-(trifluoromethyl)-2H-benzo[d][1,2,3]triazol-2-yl)benzyl methacrylate (WL-1), 2-hydroxy-5-methoxy-3-(5-methoxy-2H-benzo[d][1,2,3]triazol-2-yl)benzyl methacrylate (WL-5), 3-(5-fluoro-2H-benzo[d][1,2,3]triazol-2-yl)-2-hydroxy-5-methoxybenzyl methacrylate (WL-2), 3-(2H-benzo[d][1,2,3]triazol-2-yl)-2-hydroxy-5-methoxybenzyl methacrylate (WL-3), 3-(5-chloro-2H-benzo[d][1,2,3]triazol-2-yl)-2-hydroxy-5-methoxybenzyl methacrylate (WL-4), 2-hydroxy-5-methoxy-3-(5-methyl-2H-benzo[d][1,2,3]triazol-2-yl)benzyl methacrylate (WL-6), 2-hydroxy-5-methyl-3-(5-(trifluoromethyl)-2H-benzo[d][1,2,3]triazol-2-yl)benzyl methacrylate (WL-7), 4-allyl-2-(5-chloro-2H-benzo[d][1,2,3]triazol-2-yl)-6-methoxyphenol (WL-8), 2-{2'-Hydroxy-3'-tert-5'[3"-(4"-vinylbenzyloxy)propoxy]phenyl}-5-methoxy-2H-benzotriazole, phenol, 2-(5-chloro-2H-benzotriazol-2-yl)-6-(1,1-dimethylethyl)-4-ethenyl- (UVAM), 2-[2'-hydroxy-5'-(2-methacryloxyethyl)phenyl)]-2H-benzotriazole (2-Propenoic acid, 2-methyl-, 2-[3-(2H-benzotriazol-2-yl)-4-hydroxyphenyl]ethyl ester, Norbloc), 2-{2'-Hydroxy-3'-tert-butyl-5'-[3'-methacryloyloxypropoxy]phenyl}-2H-benzotriazole, 2-{2'-Hydroxy-3'-tert-butyl-5'-[3'-methacryloyloxypropoxy]phenyl}-5-methoxy-2H-benzotriazole (UV13), 2-{2'-Hydroxy-3'-tert-butyl-5'-[3'-methacryloyloxypropoxy]phenyl}-5-chloro-2H-benzotriazole (UV28), 2-[2'-Hydroxy-3'-tert-butyl-5'-(3'-acryloyloxypropoxy) phenyl]-5-trifluoromethyl-2H-benzotriazole (UV23), 2-(2'-hydroxy-5'-methacrylamidophenyl)-5-methoxybenzotriazole (UV6), 2-(3-allyl-2-hydroxy-5-methylphenyl)-2H-benzotriazole (UV9), 2-(2-Hydroxy-3-methallyl-5-methylphenyl)-2H-benzotriazole (UV12), 2-3'-t-butyl-2'-hydroxy-5'-(3"-dimethylvinylsilylpropoxy)-2'-hydroxy-phenyl)-5-methoxybenzotriazole (UV15), 2-(2'-hydroxy-5'-methacryloylpropyl-3'-tert-butyl-phenyl)-5-methoxy-2H-benzotriazole (UV16), 2-(2'-hydroxy-5'-acryloylpropyl-3'-tert-butyl-phenyl)-5-methoxy-2H-benzotriazole (UV16A), 2-Methylacrylic acid 3-[3-tert-butyl-5-(5-chlorobenzotriazol-2-yl)-4-hydroxyphenyl]-propyl ester (16-100, CAS #96478-15-8), 2-(3-(tert-butyl)-4-hydroxy-5-(5-methoxy-2H-benzo[d][1,2,3]triazol-2-yl)phenoxy)ethyl methacrylate (16-102); Phenol, 2-(5-chloro-2H-benzotriazol-2-yl)-6-methoxy-4-(2-propen-1-yl) (CAS #1260141-20-5); 2-[2-Hydroxy-5-[3-(methacryloyloxy)propyl]-3-tert-butylphenyl]-5-chloro-2H-benzotriazole; Phenol, 2-(5-ethenyl-2H-benzotriazol-2-yl)-4-methyl-, homopolymer (9CI) (CAS #83063-87-0). In accordance with the invention, the polymerizable composition comprises about 0.1% to about 3.0%, preferably about 0.2% to about 2.5%, more preferably about 0.3% to about 2.0%, by weight of one or more UV-absorbing vinylic monomers, related to the amount of all polymerizable components in the polymerizable composition.

Where a vinylic monomer capable of absorbing ultraviolet radiation and high energy violet light (HEVL) is used in the invention, a Germanium-based Norrish Type I photoinitiator and a light source including a light in the region of about 400 to about 550 nm are preferably used to initiate a free-radical polymerization. Any Germanium-based Norrish Type I photoinitiators can be used in this invention, so long as they are capable of initiating a free-radical polymerization under irradiation with a light source including a light in the region of about 400 to about 550 nm. Examples of Germane-based Norrish Type I photoinitiators are acylgermanium compounds described in U.S. Pat. No. 7,605,190.

A polymerizable composition for making contact lenses can also comprise other necessary components known to a person skilled in the art, such as, for example, a free-radical initiator (thermal polymerization initiators or photoinitiators), a visibility tinting agent (e.g., reactive dyes, polymerizable dyes, pigments, or mixtures thereof, as well known to a person skilled in the art), antimicrobial agents (e.g., preferably silver nanoparticles), a bioactive agent, leachable tear-stabilizing agents, and mixtures thereof, as known to a person skilled in the art.

Any thermal polymerization initiators can be used in the invention. Suitable thermal polymerization initiators are known to the skilled artisan and comprise, for example peroxides, hydroperoxides, azo-bis(alkyl- or cycloalkylnitriles), persulfates, percarbonates, or mixtures thereof. Examples of preferred thermal polymerization initiators include without limitation benzoyl peroxide, t-butyl peroxide, t-amyl peroxybenzoate, 2,2-bis(tert-butylperoxy)butane, 1,1-bis(tert-butylperoxy)cyclohexane, 2,5-Bis(tert-butylperoxy)-2,5-dimethylhexane, 2,5-bis(tert-butylperoxy)-2,5-dimethyl-3-hexyne, bis(1-(tert-butylperoxy)-1-methylethyl) benzene, 1,1-bis(tert-butylperoxy)-3,3,5-trimethylcyclohexane, di-t-butyl-diperoxyphthalate, t-butyl hydroperoxide, t-butyl peracetate, t-butyl peroxybenzoate, t-butylperoxy isopropyl carbonate, acetyl peroxide, lauroyl peroxide, decanoyl peroxide, dicetyl peroxydicarbonate, di(4-t-butylcyclohexyl)peroxy dicarbonate (Perkadox 16S), di(2-ethylhexyl)peroxy dicarbonate, t-butylperoxy pivalate (Lupersol 11); t-butylperoxy-2-ethylhexanoate (Trigonox 21-C50), 2,4-pentanedione peroxide, dicumyl peroxide, peracetic acid, potassium persulfate, sodium persulfate, ammonium persulfate, 2,2'-azobis(4-methoxy-2,4-dimethylvaleronitrile) (VAZO 33), 2,2'-Azobis[2-(2-imidazolin-2-yl)propane]dihydrochloride (VAZO 44), 2,2'-azobis(2-amidinopropane) dihydrochloride (VAZO 50), 2,2'-azobis(2,4-dimethylvaleronitrile) (VAZO 52), 2,2'-azobis(isobutyronitrile) (VAZO 64 or AIBN), 2,2'-azobis-2-methylbutyronitrile (VAZO 67), 1,1-azobis(1-cyclohexanecarbonitrile) (VAZO 88); 2,2'-azobis(2-cyclopropylpropionitrile), 2,2'-azobis(methylisobutyrate), 4,4'-Azobis(4-cyanovaleric acid), and combinations thereof. Preferably, the thermal initiator is 2,2'-azobis(isobutyronitrile) (AIBN or VAZO 64).

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®, Germanium-based Norrish Type I photoinitiators (e.g., those described in U.S. Pat. No. 7,605,190). Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329.

In accordance with the invention, the mole percentages of each type of repeating units in the polymeric material of a contact lens can be determined based on the mole percentage of a vinylic monomer or crosslinker, from which this type of repeating units are derived in polymerization, in a polymerizable composition for forming the contact lens.

The thermal polymerization is carried out conveniently, for example at a temperature of from 25 to 120° C. and preferably 40 to 100° C. The reaction time may vary within wide limits, but is conveniently, for example, from 1 to 24 hours or preferably from 2 to 12 hours. It is advantageous to previously degas the components and solvents used in the polymerization reaction and to carry out said copolymerization reaction under an inert atmosphere, for example under a nitrogen or argon atmosphere.

The actinic polymerization can then be triggered off by actinic radiation, for example light, in particular UV light or visible light of a suitable wavelength. The spectral requirements can be controlled accordingly, if appropriate, by addition of suitable photosensitizers.

In accordance with the invention, the soft contact lens has: a water content of from about 10% to about 80%, preferably from about 20% to about 80%, more preferably from about 30% to about 70% by weight (at room temperature, about 22° C. to 28° C.); an elastic modulus of from about 0.2 MPa to about 1.5 MPa (preferably from about 0.3 MPa to about 1.3 MPa, more preferably from about 0.4 MPa to about 1.1 MPa, even more preferably from about 0.5 MPa to about 1.0 MPa; a UVB transmittance of about 10% or less (preferably about 5% or less, more preferably about 2.5% or less, even more preferably about 1% or less) between 280 and 315 nanometers; a UVA transmittance of about 30% or less (preferably about 20% or less, more preferably about 10% or less, even more preferably about 5% or less) between 315 and 380 nanometers; and a Violet transmittance of from 0% to about 70%, preferably from 5% to about 60%, more preferably from 5% to about 50%, even more preferably from about 5% to about 40% between 380 nm and 440 nm, when being fully hydrated.

In another aspect, the invention provides a coated soft contact lens which comprises: a lens body; and a coating thereon, wherein the lens body is composed of a crosslinked polymeric material comprising repeating units of at least one arylborono-containing vinylic monomer, wherein the coating comprises a layer of a phosphorylcholine-containing polymer which comprises (a) repeating units of vinyl alcohol and (b) PC-containing repeating units each having a formula of

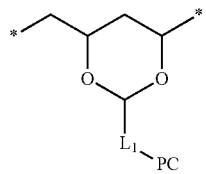

in which $L_1$ is a $C_1$-$C_6$ (preferably $C_1$) divalent alkylene radical and PC is a monovalent zwitterionic group of

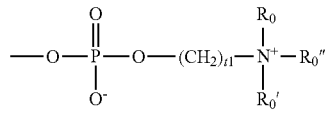

in which t1 is an integer of 1 to 5 and $R_0$, $R_0'$ and $R_0''$ independently of one another are $C_1$-$C_4$ alkyl, wherein the coating is covalent attached onto the lens body through linkages each formed between one of the boronic acid groups of the crosslinked polymeric material and one of the 1,3-diol moieties of the phosphorylcholine-containing polymer.

A lens body has a 3-dimensional shape of a contact lens is designated as a preformed contact lens, because it is formed from a polymerizable composition according to any known methods as described above prior to the application of a coating thereon.

In accordance with the invention, the coated soft contact lens has: a water content of from about 10% to about 80%, preferably from about 20% to about 80%, more preferably from about 30% to about 70% by weight (at room temperature, about 22° C. to 28° C.); an elastic modulus of from about 0.2 MPa to about 1.5 MPa (preferably from about 0.3 MPa to about 1.3 MPa, more preferably from about 0.4 MPa to about 1.1 MPa, even more preferably from about 0.5 MPa to about 1.0 MPa; a UVB transmittance of about 10% or less (preferably about 5% or less, more preferably about 2.5% or less, even more preferably about 1% or less) between 280 and 315 nanometers; a UVA transmittance of about 30% or less (preferably about 20% or less, more preferably about 10% or less, even more preferably about 5% or less) between 315 and 380 nanometers; and a Violet transmittance of from 0% to about 70%, preferably from 5% to about 60%, more preferably from 5% to about 50%, even more preferably from about 5% to about 40% between 380 nm and 440 nm, when being fully hydrated.

In accordance with the invention, each type of arylborono-containing repeating units can be derived directly from an arylborono-containing vinylic monomer, preferably from an arylborono-containing vinylic monomer of formula (VIII)

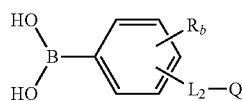

in which: $R_b$ is H, $NO_2$, F, Cl, or $CF_3$; Q is a monovalent radial of

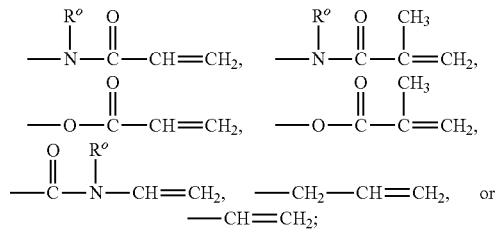

$L_2$ is a direct bond, a $C_1$-$C_4$ alkylene divalent radical, a divalent radical of

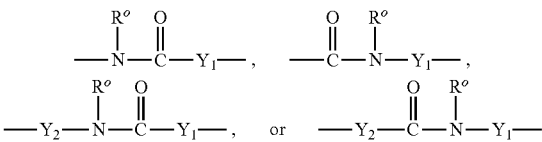

in which $Y_1$ is CH(OH) or a $C_1$-$C_4$ alkylene divalent radical, $Y_2$ is a $C_1$-$C_4$ alkylene divalent radical, and $R^o$ is H or a $C_1$-$C_4$ alkyl.

Examples of preferred arylborono-containing vinylic monomers of formula (II) include without limitation 3-vinylphenylboronic acid, 4-vinylboronic acid, 3-(meth)acrylamidophenylboronic acid, 4-(meth)acrylamidophenylboronic acid, a reaction product of an amino-containing phenylboronic acid derivative with (meth)acrylic acid halide, a reaction product of an amino-containing phenylboronic acid derivative with a carboxy-containing vinylic monomer (any one of those described above) in the presence of a carbodiimide (e.g., 1-ethyl-3-(3-dimethylaminopropyl) carbodiimide (EDC), N,N'-dicyclohexylcarbodiimide (DCC), 1-cylcohexyl-3-(2-morpholinoethyl)carbodiimide, diisopropyl carbodiimide, or mixtures thereof) and N-hydroxysuccinimide, a reaction product of a carboxy-containing phenylboronic acid derivative with an amino-containing vinylic monomer (any one of those described above) in the presence of a carbodiimide (e.g., 1-ethyl-3-(3-dimethylaminopropyl) carbodiimide (EDC), N,N'-dicyclohexylcarbodiimide (DCC), 1-cylcohexyl-3-(2-morpholinoethyl)carbodiimide, diisopropyl carbodiimide, or mixtures thereof) and N-hydroxysuccinimide, and combinations thereof.

Examples of preferred carboxy-containing phenylboronic acid derivatives include without limitation 3-carboxyphenylboronic acid, 4-carboxyphenylboronic acid, 3-boronophenylacetic acid, 4-boronophenylacetic acid, 2-(4-boronophenyl)-2-methylpropanoic acid, 3-(4-boronophenyl)propanoic acid, 3-(3-boronophenyl)propanoic acid, 5-(3-boronophenyl)pentanoic acid, 5-(4-boronophenyl)pentanoic acid, 4-(2-carboxyethyl)-3-nitrophenylboronic acid, 3-(3-carboxypropyonylamino)phenylboronic acid, 3-amino-3-(4-boronophenyl)propanoic acid, and combinations thereof.

Examples of preferred amino-containing phenylboronic acid derivatives include without limitation 3-aminophenylboronic acid, 4-aminophenylboronic acid, 4-amino-3-nitrophenylboronic acid, 4-amino-4-fluorophenylboronic acid, 2-(aminomethyl)-5-nitrophenylboronic acid, 3-(aminomethyl)-phenylboronic acid, 3-amino-5-nitrophenylboronic acid, 3-amino-3-(4-boronophenyl)propanoic acid, and combinations thereof.

In accordance with this aspect of the invention, a PC-containing polymer can be prepared by reacting a polyvinylalcohol with a PC-containing aldehyde compound (preferably with phosphorylcholine glyceraldehyde) as described above. Preferably, the PC-containing polymer comprises from about 20% to about 95% by mole (preferably from 25% to 95%, more preferably from 40% to 90%, even more preferably from 60% to 90%) of the repeating units of vinyl alcohol and from about 5% to about 80% by mole (preferably from 5% to 75%, more preferably from 10% to 60%, even more preferably from 10% to 40%) of the PC-containing repeating units, provided that the sum of the amounts of the repeating units of vinyl alcohol, the PC-containing repeating units and other not listed repeating units is 100%.

In a preferred embodiment, the lens body of a soft contact lens of the invention is composed of a non-silicone hydrogel material which comprises at least 50% by mole of repeating units of at least one hydroxyl-containing vinylic monomer, preferably selected from the group consisting of hydroxyethyl (meth)acrylate, glycerol (meth)acrylate, 3-hydroxypropyl (meth)acrylate, 2-hydroxypropyl (meth)acrylate, 3-amino-2-hydroxypropyl (meth)acrylate, N-2-hydroxyethyl (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl) methyl (meth)acrylamide, vinyl alcohol, allyl alcohol, and combinations thereof, more preferably selected from the group consisting of hydroxyethyl (meth)acrylate and glycerol (meth)acrylate. The mole percentages of repeating units can be calculated based on a non-silicone hydrogel lens formulation for making the non-silicone hydrogel contact lens.

In another preferred embodiment, the lens body of a soft contact lens of the invention is composed of a silicone hydrogel material which comprises (a) repeating units of at least one silicone-containing vinylic monomer and/or at least one silicone-containing vinylic crosslinker and (b) repeating units of at least one one hydrophilic vinylic monomer.

Various embodiments of silicone hydrogel materials, silicone-containing vinylic monomers, silicone-containing vinylic crosslinkers, hydrophilic vinylic monomers, hydrophobic vinylic monomers, non-silicone vinylic crosslinkers, UV-absorbing vinylic monomers, HEVL-absorbing vinylic monomers, thermal polymerization initiators, photoinitiators, and others have been described above and are incorporated in this aspect of the invention.

In accordance with the invention, the application of a coating thereon is performed contacting of a preformed contact lens with an aqueous solution of a PC-containing polymer of the invention, based on the reactions between one of 1,2-diol or 1,3-diol moieties of the PC-containing polymer and one of the arylborono-containing repeating units of the crosslinked polymeric material to form one cyclic boronic ester linkage, as illustrated in Scheme III.

Scheme III

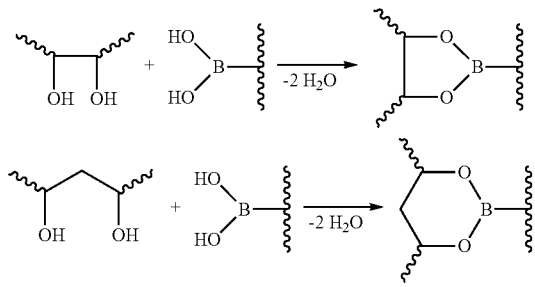

The formed cyclic boronic ester linkages are highly stable under autoclave conditions and thereby the layer (or coating) of the PC-containing polymer is stably anchored onto the soft contact lens for enhancing the surface lubricity of the soft contact lens.

The contacting can occur by dipping the preformed contact lens into the aqueous solution or by spraying it with the aqueous solution. One contacting process involves solely dipping the preformed contact lens in a bath of an aqueous solution for a period of time or alternatively dipping the preformed contact lens sequentially in a series of bath of aqueous solutions for a fixed shorter time period for each bath. Another contacting process involves solely spray an aqueous solution. However, a number of alternatives involve various combinations of spraying- and dipping-steps may be designed by a person having ordinary skill in the art. Preferably, the step of contacting is performed by immersing the preformed contact lens in the aqueous solution in a lens package, and the aqueous solution is a packaging solution.

The aqueous solution has a pH of from about 6.5 to about 9.0.

In any one of the above preferred embodiments, the aqueous solution comprises from about 0.01% to about 2.5% by weight (preferably from about 0.02% to about 2.0% by weight, more preferably from about 0.05% to about 1.5% by weight, even more preferably from about 0.1% to about 1% by weight) of at least one PC-containing polymer (any of those described above).

The contacting time period is preferably at least 1 minute, preferably at least 5 minutes, more preferably at least 10 minutes, even more preferably from about 20 minutes to 5 hours.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for 30 to 90 minutes under pressure) prior to dispensing to users. A person skilled in the art will understand well how to seal and sterilize lens packages.

In a preferred embodiment, the aqueous solution is a packaging solution which contains at least one buffering agent and one or more other ingredients known to a person skilled in the art. Examples of other ingredients include without limitation, tonicity agents, surfactants, antibacterial agents, preservatives, and lubricants (e.g., cellulose derivatives, polyvinyl alcohol, polyvinylpyrrolidone).

The packaging solution contains a buffering agent in an amount sufficient to maintain a pH of the packaging solution in the desired range. Any known, physiologically compatible buffering agents can be used. Suitable buffering agents as a constituent of the contact lens care composition according to the invention are known to the person skilled in the art. Examples are boric acid, borates, e.g. sodium borate, citric acid, citrates, e.g. potassium citrate, bicarbonates, e.g. sodium bicarbonate, TRIS (2-amino-2-hydroxymethyl-1,3-propanediol), Bis-Tris (Bis-(2-hydroxyethyl)-imino-tris-(hydroxymethyl)-methane), bis-aminopolyols, triethanolamine, ACES (N-(2-hydroxyethyl)-2-aminoethanesulfonic acid), BES (N,N-Bis(2-hydroxyethyl)-2-aminoethanesulfonic acid), HEPES (4-(2-hydroxyethyl)-1-piperazineethanesulfonic acid), MES (2-(N-morpholino)ethanesulfonic acid), MOPS (3-[N-morpholino]- propanesulfonic acid), PIPES (piperazine-N,N'-bis(2-ethanesulfonic acid), TES (N-[Tris(hydroxymethyl)methyl]-2-aminoethanesulfonic acid), salts thereof, phosphate buffers, e.g. Na$_2$HPO$_4$, NaH$_2$PO$_4$, and KH$_2$PO$_4$ or mixtures thereof. Preferably, the buffering agents are phosphate buffers, borate buffers, or combinations thereof. The amount of each buffer agent in a packaging solution is preferably from 0.001% to 2%, preferably from 0.01% to 1%; most preferably from about 0.05% to about 0.30% by weight.

The packaging solution has a tonicity of from about 200 to about 450 milliosmol (mOsm), preferably from about 250 to about 350 mOsm. The tonicity of a packaging solution can be adjusted by adding organic or inorganic substances which affect the tonicity. Suitable occularly acceptable tonicity agents include, but are not limited to sodium chloride, potassium chloride, and mixtures thereof.

A packaging solution of the invention has a viscosity of from about 1 centipoise to about 5 centipoises, at 25° C.

In a preferred embodiment, the packaging solution comprises preferably from about 0.01% to about 2%, more preferably from about 0.05% to about 1.5%, even more preferably from about 0.1% to about 1%, most preferably from about 0.2% to about 0.5%, by weight of the PC-containing polymer.

In a further aspect, the invention provides an ophthalmic solution comprising from about 0.01% to about 2%, preferably from about 0.05% to about 1.5%, more preferably from about 0.1% to about 1%, even more preferably from about 0.2% to about 0.5%, by weight of a PC-containing polymer which comprises (a) repeating units of vinyl alcohol and (b) PC-containing repeating units each having a formula of

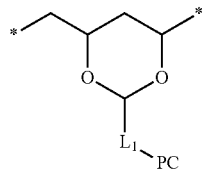

in which L$_1$ is a C$_1$-C$_6$ (preferably C$_1$) divalent alkylene radical and PC is a monovalent zwitterionic group of

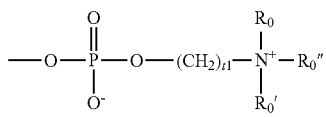

in which t1 is an integer of 1 to 5 and R$_0$, R$_0$' and R$_0$" independently of one another are C$_1$-C$_4$ alkyl.

In accordance with the invention, an ophthalmic solution of the invention can be an eye drop, a lens care solution for cleaning and/or disinfecting contact lenses, a contact lens wetting solution, and preferably a packaging solution for packaging and sterilizing contact lenses in lens packages.

An ophthalmic solution of the invention comprises at least one buffering agent in an amount sufficient to maintain a pH of from about 6.5 to about 9.0. Any of the buffering agents described can be used here.

An ophthalmic solution of the invention has a tonicity of from about 200 to about 450 milliosmol (mOsm), preferably from about 250 to about 350 mOsm. Any one of the tonicity agents described above can be used here.

An ophthalmic solution of the invention has a viscosity of from about 1 centipoise to about 5 centipoises, at 25° C.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together, as illustrated below:

1. A non-polymerizable preformed phosphorylcholine-containing polymer comprising: (a) first repeating units of vinyl alcohol and/or vinyl acetate; and (b) second repeating units of 6-membered acetal ring substituted with a phosphorylcholine-containing group.

2. The non-polymerizable preformed phosphorylcholine-containing polymer of invention 1, wherein the non-polymerizable preformed phosphorylcholine-containing polymer comprises (a) the first repeating units in an amount, designated as M1, of from about 60% to about 99% by mole, wherein the first repeating units have a formula of

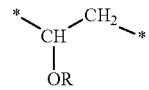

in which R is H or —C(O)CH$_3$, and (b) the second repeating units in an amount, designated as M2, of from about 1% to about 40% by mole, wherein the second repeating units have a formula of

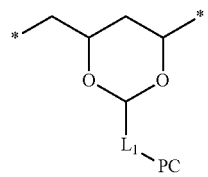

which L$_1$ is a C$_1$-C$_6$ divalent alkylene radical and PC is a monovalent zwitterionic group of

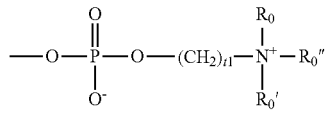

in which t1 is an integer of 1 to 5 and R$_0$, R$_0$' and R$_0$" independently of one another are C$_1$-C$_4$ alkyl, wherein (M1+M2) is greater than about 90% by mole.

3. The non-polymerizable preformed phosphorylcholine-containing polymer of invention 1, wherein the non-polymerizable preformed phosphorylcholine-containing polymer comprises (a) the first repeating units in an amount, designated as M1, of from about 65% to about 98% by mole, wherein the first repeating units have a formula of

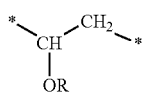

in which R is H or —C(O)CH$_3$, and (b) the second repeating units in an amount, designated as M2, of from about 2% to about 35% by mole, wherein the second repeating units have a formula of

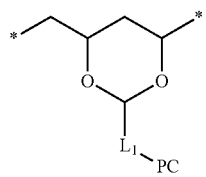

in which L$_1$ is a C$_1$-C$_6$ divalent alkylene radical and PC is a monovalent zwitterionic group of

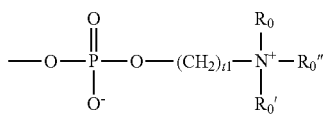

in which t1 is an integer of 1 to 5 and R$_0$, R$_0$' and R$_0$" independently of one another are C$_1$-C$_4$ alkyl, wherein (M1+M2) is greater than about 90% by mole.

4. The non-polymerizable preformed phosphorylcholine-containing polymer of invention 1, wherein the non-polymerizable preformed phosphorylcholine-containing polymer comprises (a) the first repeating units in an amount, designated as M1, of from about 70% to about 97% by mole, wherein the first repeating units have a formula of

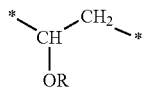

in which R is H or —C(O)CH$_3$, and (b) the second repeating units in an amount, designated as M2, of from about 3% to 30% by mole, wherein the second repeating units have a formula of

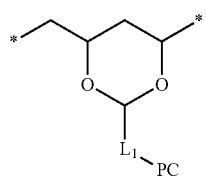

in which L$_1$ is a C$_1$-C$_6$ divalent alkylene radical and PC is a monovalent zwitterionic group of

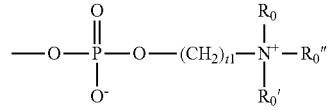

in which t1 is an integer of 1 to 5 and R$_0$, R$_0$' and R$_0$" independently of one another are C$_1$-C$_4$ alkyl, wherein (M1+M2) is greater than about 90% by mole.

5. The non-polymerizable preformed phosphorylcholine-containing polymer of invention 1, wherein the non-polymerizable preformed phosphorylcholine-containing polymer comprises (a) the first repeating units in an amount, designated as M1, of from about 75% to about 96% by mole, wherein the first repeating units have a formula of

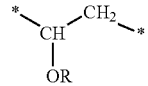

in which R is H or —C(O)CH$_3$, and (b) the second repeating units in an amount, designated as M2, of from about 4% to 25% by mole, wherein the second repeating units have a formula of

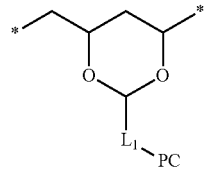

in which L$_1$ is a C$_1$-C$_6$ divalent alkylene radical and PC is a monovalent zwitterionic group of

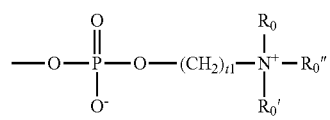

in which t1 is an integer of 1 to 5 and R$_0$, R$_0$' and R$_0$" independently of one another are C$_1$-C$_4$ alkyl, wherein (M1+M2) is greater than about 90% by mole.

6. The non-polymerizable preformed phosphorylcholine-containing polymer of any one of inventions 2 to 5, wherein (M1+M2) is greater than about 95% by mole.

7. The non-polymerizable preformed phosphorylcholine-containing polymer of any one of inventions 2 to 5, wherein (M1+M2) is greater than about 98% by mole.

8. The non-polymerizable preformed phosphorylcholine-containing polymer of any one of inventions 2 to 7, wherein L$_1$ is a C$_1$ divalent alkylene radical.

9. The non-polymerizable preformed phosphorylcholine-containing polymer of any one of inventions 1 to 8, having a number-average molecular weight M$_n$ of from 10,000 to 2,000,000 Daltons.

10. The non-polymerizable preformed phosphorylcholine-containing polymer of any one of inventions 1 to 8, having a number-average molecular weight M$_n$ of from 10,000 to 1,000,000 (preferably from 20,000 to 500,000) Daltons.

11. A soft contact lens, comprising: a lens bulk material which is a crosslinked polymeric material having a polymer matrix; and at least one non-polymerizable preformed phosphorylcholine-containing polymer of any one of inventions 1 to 10, wherein the non-polymerizable preformed PC-containing polymer is not covalently attached to the crosslinked polymeric material and is distributed within the polymer matrix.

12. The soft contact lens of invention 11, wherein the soft contact lens comprises at least two non-polymerizable preformed PC-containing polymers of any one of inventions 1 to 10, wherein one of the two non-polymerizable preformed PC-containing polymers has a number-average molecular weight of from 10,000 to 100,000 Daltons while the other has a number-average molecular weight of from 200,000 to 2,000,000 Daltons.

13. The soft contact lens of invention 12, wherein the weight proportion of the two non-polymerizable preformed PC-containing polymers is from 1:1 to 5:1.

14. The soft contact lens of invention 12, wherein the weight proportion of the two non-polymerizable preformed PC-containing polymers is from 1:1 to 4:1.

15. The soft contact lens of invention 12, wherein the weight proportion of the two non-polymerizable preformed PC-containing polymers is from 1:1 to 3:1.

16. A coated soft contact lens, comprising:
a lens body, wherein the lens body is composed of a crosslinked polymeric material comprising repeating units of at least one arylborono-containing vinylic monomer; and a coating thereon, wherein the coating comprises a layer of a non-polymerizable preformed phosphorylcholine-containing polymer of any one of inventions 1 to 10, wherein the coating is covalent attached onto the lens body through linkages each formed between one of the boronic acid groups of the crosslinked polymeric material and one of the 1,3-diol moieties of the phosphorylcholine-containing polymer.

17. The coated soft contact lens of invention 16, wherein the arylborono-containing vinylic monomer is a vinylic monomer of formula (VIII)

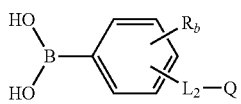

in which:
$R_b$ is H, $NO_2$, F, Cl, or $CF_3$;
Q is a monovalent radical of

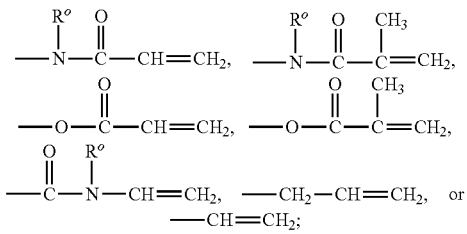

$L_2$ is a direct bond, a $C_1$-$C_4$ alkylene divalent radical, a divalent radical of

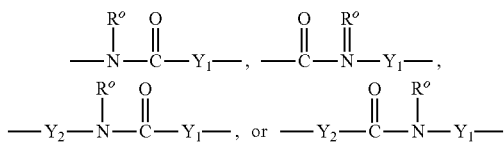

in which $Y_1$ is CH(OH) or a $C_1$-$C_4$ alkylene divalent radical, $Y_2$ is a $C_1$-$C_4$ alkylene divalent radical, and $R^o$ is H or a $C_1$-$C_4$ alkyl.

18. The soft contact lens of any one of inventions 11 to 15 or the coated soft contact lens of invention 16 or 17, wherein the crosslinked polymeric material is a non-silicone hydrogel material.

19. The soft contact lens or the coated soft contact lens of invention 18, wherein the non-silicone hydrogel material comprises at least 50% by mole of repeating units of at least one hydroxyl-containing vinylic monomer, preferably selected from the group consisting of hydroxyethyl (meth)acrylate, glycerol (meth)acrylate, 3-hydroxypropyl (meth)acrylate, 2-hydroxypropyl (meth)acrylate, 3-amino-2-hydroxypropyl (meth)acrylate, N-2-hydroxyethyl (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, allyl alcohol, and combinations thereof, more preferably selected from the group consisting of hydroxyethyl (meth)acrylate and glycerol (meth)acrylate.

20. The soft contact lens or the coated soft contact lens of invention 18, wherein the non-silicone hydrogel material comprises at least 50% by mole of repeating units of vinyl alcohol.

21. The soft contact lens or the coated soft contact lens of invention 18, wherein the non-silicone hydrogel material comprises at least 60% by mole of repeating units of vinyl alcohol.

22. The soft contact lens or the coated soft contact lens of invention 18, wherein the non-silicone hydrogel material comprises at least 70% by mole of repeating units of vinyl alcohol.

23. The soft contact lens or the coated soft contact lens of invention 18, wherein the non-silicone hydrogel material comprises at least 75% by mole of repeating units of vinyl alcohol.

24. The soft contact lens or the coated soft contact lens of invention 18, wherein the non-silicone hydrogel material is a crosslinking product of at least one water-soluble actinically-polymerizable polyvinyl alcohol prepolymer in the presence or absence of a vinylic monomer and/or vinylic crosslinking agent, wherein the water-soluble actinically-polymerizable polyvinyl alcohol prepolymer comprises:
repeating vinyl alcohol units of $$*\!\!\diagdown_{\displaystyle CH}\!\diagup^{\displaystyle CH_2}\!\!\diagdown_*;$$
$$\quad\;\;|$$
$$\quad\;OH$$

and repeating crosslinking units of formula (I);

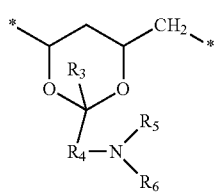

in which
R$_3$ is hydrogen or a C$_1$-C$_6$ alkyl group;
R$_4$ is a C$_1$-C$_6$ alkylene divalent radical;
R$_5$ is hydrogen or C$_1$-C$_6$ alkyl;
R$_6$ is an ethylenically unsaturated group of

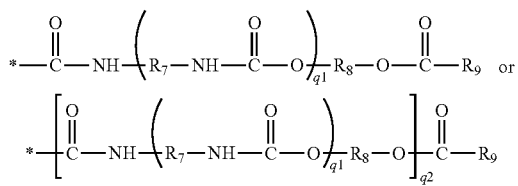

in which q1 and q2 independently of each another are zero or one, and R$_7$ and R$_8$ independently of one another are a C$_2$-C$_8$ alkylene divalent radical, R$_9$ is C$_2$-C$_8$ alkenyl.

25. The soft contact lens or the coated soft contact lens of invention 24, wherein R$_3$ is hydrogen.
26. The soft contact lens or the coated soft contact lens of invention 24 or 25, wherein R$_4$ is a C$_1$-C$_6$ alkylene divalent radical.
27. The soft contact lens or the coated soft contact lens of invention 24 or 25, wherein R$_4$ is a C$_1$-C$_4$ alkylene divalent radical.
28. The soft contact lens or the coated soft contact lens of invention 24 or 25, wherein R$_4$ is methylene or butylene divalent radical.
29. The soft contact lens or the coated soft contact lens of invention 24 or 25, wherein R$_4$ is methylene divalent radical.
30. The soft contact lens or the coated soft contact lens of any one of inventions 24 to 29, wherein R$_5$ is hydrogen or C$_1$-C$_4$ alkyl.
31. The soft contact lens or the coated soft contact lens of any one of inventions 24 to 29, wherein R$_5$ is hydrogen or methyl or ethyl.
32. The soft contact lens or the coated soft contact lens of any one of inventions 24 to 29, wherein R$_5$ is hydrogen or methyl.
33. The soft contact lens or the coated soft contact lens of any one of inventions 24 to 32, wherein in formula (I), R$_3$ is H, R$_4$ is methylene divalent radical, R$_5$ is H or C$_1$-C$_4$ alkyl, R$_6$ is a radical of

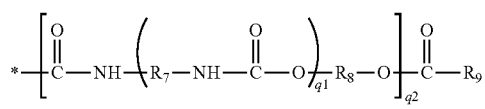

in which q2 is zero, R$_9$ is vinyl (*—CH=CH$_2$) or 1-methylethenyl (*—C(CH$_3$)=CH$_2$).

34. The soft contact lens or coated soft contact lens of any one of inventions 24 to 33, wherein the water-soluble actinically-polymerizable polyvinylalcohol prepolymer has a number average molecular weight of at least about 2,000 Daltons, and comprises from about 1% to about 25% by mole, preferably from about 2% to about 15% by mole of the repeating units of formula (I).
35. The soft contact lens or coated soft contact lens of any one of inventions 24 to 34, wherein the water-soluble actinically-polymerizable polyvinylalcohol prepolymer comprises from about 2% to about 15% by mole of the repeating units of formula (I).
36. The soft contact lens or the coated soft contact lens of any one of inventions 24 to 35, wherein the water-soluble actinically-polymerizable polyvinylacohol prepolymer further comprises repeating units of formula (II)

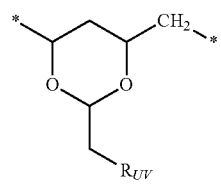

in which R$_{UV}$ is a monovalent radical of any one of formula (III)-(VII)

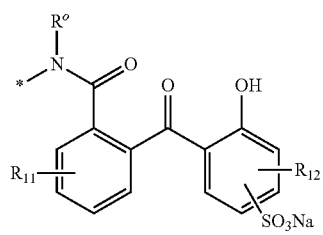

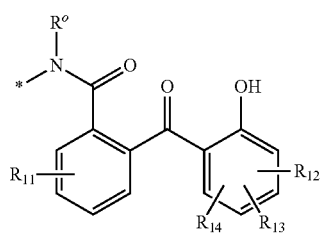

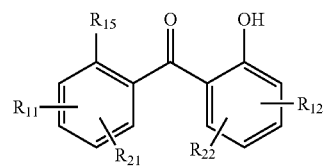

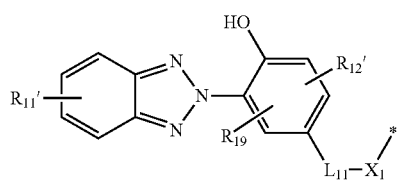

-continued

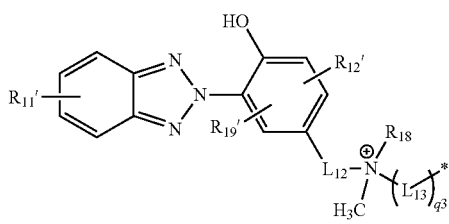
(VII)

in which:
R⁰ is H or CH₃;
$R_{11}$, $R_{12}$ and $R_{12}'$ independent of one other are H, CH₃, CCl₃, CF₃, Cl, Br, NR'R" in which R' and R" independent of each other are H or $C_1$-$C_4$ alkyl, OH, or OCH₃;
$R_{11}'$ independent of each other are H, CH₃, CCl₃, CF₃, Cl, Br, NR'R" in which R' and
R" independent of each other are H or $C_1$-$C_4$ alkyl, OH, OCH₃, SO₃H, or SO₃⁻Na⁺;
$R_{13}$ and $R_{14}$ independent of each other are H or a first hydrophilic group which is

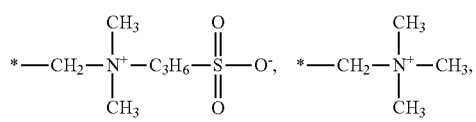
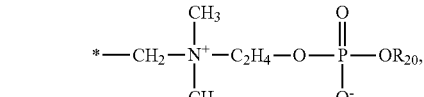
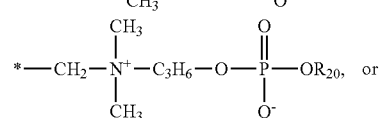
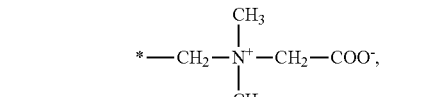

provided
that at least one of $R_{13}$ and $R_{14}$ is the first hydrophilic group;
q3 is zero or 1;
n1 is an integer of 2 to 25 (preferably 4 to 20);
$R_{15}$ is H, *—COOH, *—CONH—$C_2H_4$—$(OC_2H_4)_{n1}$—OCH₃, or *—CONH—$C_2H_4$—$(OC_2H_4)_{n1}$—OH;
one of $R_6$ and $R_{17}$ is H or a second hydrophilic group which is

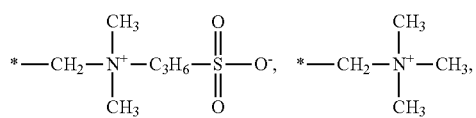
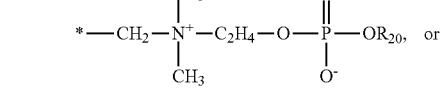

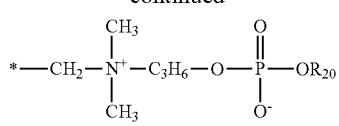

while the other of $R_{16}$ and $R_{17}$ is

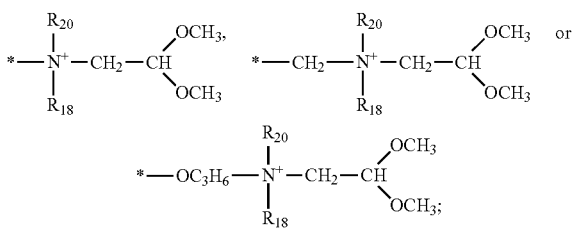

$R_{18}$ is CH₃, C₂H₅,

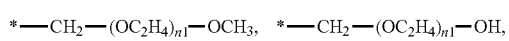
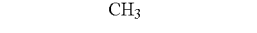

$R_{19}$ is SO₃Na,

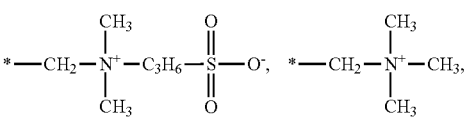

$R_{19}'$ is H, SO₃Na,

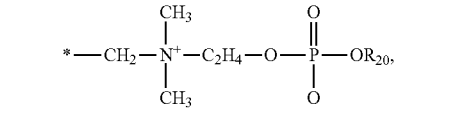

-continued

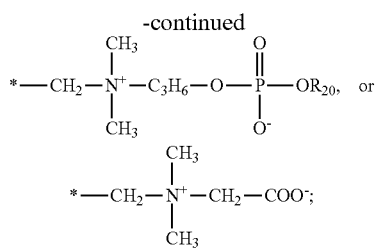

$R_{20}$ is methyl or ethyl;
$L_{11}$ is a linkage of

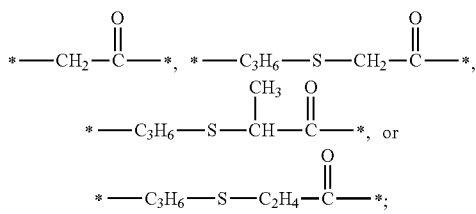

$L_{12}$ is a linkage of

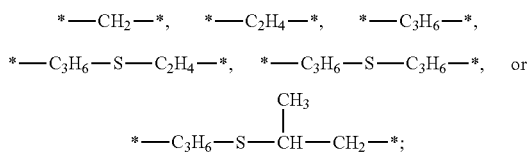

$L_{13}$ is a linkage of

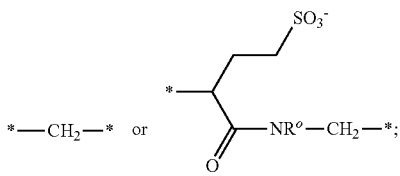

$X1$ is O or $NR^o$;
one of $R_{21}$ and $R_{22}$ is H or a second hydrophilic group which is
is

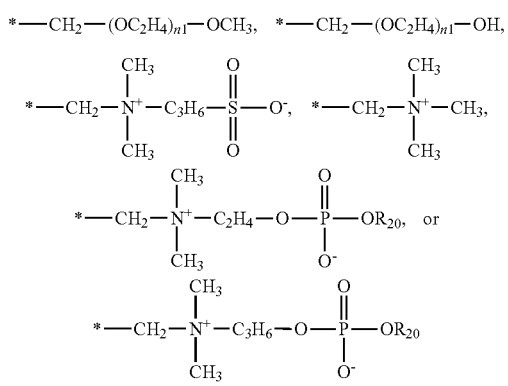

while the other of $R_{21}$ and $R_{22}$ is a divalent radical of

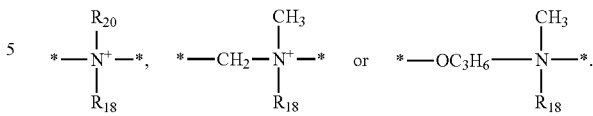

37. The soft contact lens of any one of inventions 11 to 15 or the coated soft contact lens of invention 16 or 17, wherein the crosslinked polymeric material is a silicone hydrogel material which comprises (a) repeating units of at least one silicone-containing vinylic monomer and/or at least one silicone-containing vinylic crosslinker and (b) repeating units of at least one one hydrophilic vinylic monomer.

38. The soft contact lens or the coated soft contact lens of invention 37, wherein the silicone hydrogel material comprises repeating units of at least one polysiloxane vinylic monomer.

39. The soft contact lens or the coated soft contact lens of invention 37 or 38, wherein the silicone hydrogel material comprises repeating units of at least one polysiloxane vinylic crosslinker.

40. The soft contact lens or the coated soft contact lens of any one of inventions 37 to 39, wherein the silicone hydrogel material comprises repeating units of at least one hydrophilic vinylic monomer.

41. The soft contact lens or the coated soft contact lens of any one of inventions 37 to 40, wherein the silicone hydrogel material comprises repeating units of at least one hydrophilic N-vinyl amide monomer.

42. The soft contact lens or the coated soft contact lens of any one of inventions 37 to 41, wherein the silicone hydrogel material comprises repeating units of at least one silicone-containing vinylic monomer having a bis(trialkylsilyloxy)alkylsilyl or tris(trialkylsilyloxy)silyl group.

43. The soft contact lens or the coated soft contact lens of any one of inventions 37 to 42, wherein the silicone hydrogel material comprises repeating units of one or more non-silicone vinylic crosslinking agents.

44. The soft contact lens or the coated soft contact lens of any one of inventions 37 to 43, wherein the silicone hydrogel material has an oxygen permeability of at least 40 barrers.

45. The soft contact lens or the coated soft contact lens of any one of inventions 37 to 43, wherein the silicone hydrogel material has an oxygen permeability of from about 60 to about 180 barrers.

46. The soft contact lens or the coated soft contact lens of any one of inventions 37 to 43, wherein the silicone hydrogel material has an oxygen permeability of from about 80 to about 180 barrers.

47. The soft contact lens of any one of inventions 11 to 15 and 18 to 46 or the coated soft contact lens of any one of inventions 16 to 46, having: a water content of from about 10% to about 80% by weight measured at room temperature (about 22° C. to 28° C.); an elastic modulus of from about 0.2 MPa to about 1.5 MPa; a UVB transmittance of about 10% or less between 280 and 315 nanometers; a UVA transmittance of about 30% or less between 315 and 380 nanometers; and a Violet transmittance of from 0% to about 70% between 380 nm and 440 nm, when being fully hydrated.

48. The soft contact lens of any one of inventions 11 to 15 and 18 to 46 or the coated soft contact lens of any one of inventions 16 to 46, having a water content of from about 20% to about 80% by weight, measured at room temperature (about 22° C. to 28° C.), when being fully hydrated.

49. The soft contact lens of any one of inventions 11 to 15 and 18 to 46 or the coated soft contact lens of any one of inventions 16 to 46, having a water content of from about 30% to about 70% by weight measured at room temperature (about 22° C. to 28° C.), when being fully hydrated.

50. The soft contact lens of any one of inventions 11 to 15 and 18 to 49 or the coated soft contact lens of any one of inventions 16 to 49, having an elastic modulus of from about 0.3 MPa to about 1.3 MPa, when being fully hydrated.

51. The soft contact lens of any one of inventions 11 to 15 and 18 to 49 or the coated soft contact lens of any one of inventions 16 to 49, having an elastic modulus of from about 0.4 MPa to about 1.1 MPa, when being fully hydrated.

52. The soft contact lens of any one of inventions 11 to 15 and 18 to 49 or the coated soft contact lens of any one of inventions 16 to 49, having an elastic modulus of from about 0.5 MPa to about 1.0 MPa, when being fully hydrated.

53. The soft contact lens of any one of inventions 11 to 15 and 18 to 52 or the coated soft contact lens of any one of inventions 16 to 52, having a UVB transmittance of about 5% or less between 280 and 315 nanometers, when being fully hydrated.

54. The soft contact lens of any one of inventions 11 to 15 and 18 to 52 or the coated soft contact lens of any one of inventions 16 to 52, having a UVB transmittance of about 2.5% or less between 280 and 315 nanometers, when being fully hydrated.

55. The soft contact lens of any one of inventions 11 to 15 and 18 to 52 or the coated soft contact lens of any one of inventions 16 to 52, having a UVB transmittance of about 1% or less between 280 and 315 nanometers, when being fully hydrated.

56. The soft contact lens of any one of inventions 11 to 15 and 18 to 55 or the coated soft contact lens of any one of inventions 16 to 55, having a UVA transmittance of about 20% or less between 315 and 380 nanometers, when being fully hydrated.

57. The soft contact lens of any one of inventions 11 to 15 and 18 to 55 or the coated soft contact lens of any one of inventions 16 to 55, having a UVA transmittance of about 10% or less between 315 and 380 nanometers, when being fully hydrated.

58. The soft contact lens of any one of inventions 11 to 15 and 18 to 55 or the coated soft contact lens of any one of inventions 16 to 55, having a UVA transmittance of about 5% or less between 315 and 380 nanometers, when being fully hydrated.

59. The soft contact lens of any one of inventions 11 to 15 and 18 to 58 or the coated soft contact lens of any one of inventions 16 to 58, having a Violet transmittance of from 5% to about 60% between 380 nm and 440 nm, when being fully hydrated.

60. The soft contact lens of any one of inventions 11 to 15 and 18 to 58 or the coated soft contact lens of any one of inventions 16 to 58, having a Violet transmittance of from 5% to about 50% between 380 nm and 440 nm, when being fully hydrated.

61. The soft contact lens of any one of inventions 11 to 15 and 18 to 58 or the coated soft contact lens of any one of inventions 16 to 58, having a Violet transmittance of from about 5% to about 40% between 380 nm and 440 nm, when being fully hydrated.

62. An ophthalmic solution, comprising:
from about 0.01% to about 2% by weight of a non-polymerizable preformed phosphorylcholine-containing polymer of any one of inventions 1 to 10; and at least one buffering agent for maintaining a pH of from about 6.5 to about 9.0, wherein the ophthalmic solution has a pH of from about 6.5 to about 9.0, a tonicity of from about 200 to about 450 milliosmol (mOsm) (preferably from about 250 to about 350 mOsm) at 25° C., and a viscosity of from about 1 centipoise to about 5 centipoises at 25° C.

63. An ophthalmic solution, comprising from about 0.05% to about 1.5% by weight of a non-polymerizable preformed phosphorylcholine-containing polymer of any one of inventions 1 to 10; and at least one buffering agent for maintaining a pH of from about 6.5 to about 9.0, wherein the ophthalmic solution has a pH of from about 6.5 to about 9.0, a tonicity of from about 200 to about 450 milliosmol (mOsm) (preferably from about 250 to about 350 mOsm) at 25° C., and a viscosity of from about 1 centipoise to about 5 centipoises at 25° C.

64. An ophthalmic solution, comprising from about 0.1% to about 1% by weight of a non-polymerizable preformed phosphorylcholine-containing polymer of any one of inventions 1 to 10; and at least one buffering agent for maintaining a pH of from about 6.5 to about 9.0, wherein the ophthalmic solution has a pH of from about 6.5 to about 9.0, a tonicity of from about 200 to about 450 milliosmol (mOsm) (preferably from about 250 to about 350 mOsm) at 25° C., and a viscosity of from about 1 centipoise to about 5 centipoises at 25° C.

65. An ophthalmic solution, comprising from about 0.2% to about 0.5% by weight of a non-polymerizable preformed phosphorylcholine-containing polymer of any one of inventions 1 to 10; and at least one buffering agent for maintaining a pH of from about 6.5 to about 9.0, wherein the ophthalmic solution has a pH of from about 6.5 to about 9.0, a tonicity of from about 200 to about 450 milliosmol (mOsm) (preferably from about 250 to about 350 mOsm) at 25° C., and a viscosity of from about 1 centipoise to about 5 centipoises at 25° C.

66. The ophthalmic solution of any one of inventions 62 to 65, wherein the ophthalmic solution is a packaging solution for packaging and sterilizing contact lenses in packages.

67. The ophthalmic solution of any one of inventions 62 to 66, wherein the ophthalmic solution has a tonicity of from about 250 to about 350 mOsm at 25° C.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested.

It is intended that the specification and examples be considered as exemplary.

Example 1

This example illustrates how to prepare phosphorylcholine glyceraldehyde (PCGA) through oxidative cleavage of glyceryl phosphorylchlorine (GPC), as illustrated by the scheme below, according to the procedures similar to what is described in articles, e.g., by Gao et al. in Macromol Res. (2012), 20, 1063-1069, by Lu et al. in J. Polym. Res. (2012), 19, 9959-9969, and by Miyazawa and Winnik in Macromolecules (2002), 35, 9536-9544.

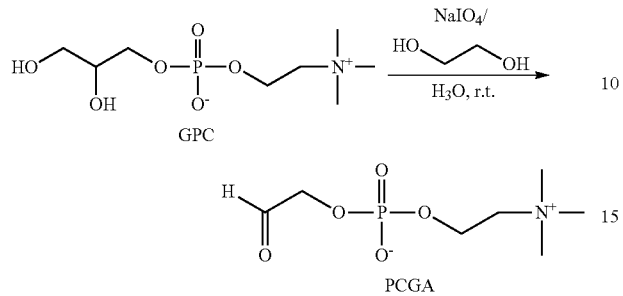

GPC

PCGA

In a flask, glyceryl phosphorylcholine (GPC, 120.0 g, 0.47 mol), sodium periodate (200.0 g, 0.94 mol) are dissolved in 3000 mL deionized water. The reaction mixture is stirred at room temperature for 16 hours. Then ethylene glycol (36 mL, 0.65 mol) is added to the solution and the mixture is stirred for another 1 hour. The mixture is concentrated under vacuum to yield a white solid, which is then added to ethanol (1000 mL) and stirred for 2 hours. The insoluble solid is filtered off with fritted glass filter (pore size M). The filtrate is concentrated on rotary evaporator and then under low vacuum to remove the solvent. A colorless viscous liquid is obtained in 113.7 g (91%) yield.

Due to the hygroscopicity, the molecule PCGA is present in the hydrated form. $^1$H-NMR spectrum and gravimetric analysis shows the purity of the product is 71.0%, and the product that is prepared by this method also contains 25.1 wt % water and 3.9 wt % ethylene glycol.

Examples 2-9

Examples 2-9 illustrate the preparation of PC-modified polyvinyl alcohol, PVA-g-PC according to the synthetic route similar to those described in U.S. Pat. No. 5,508,317 and in articles (Shibatani, K.; Fujii, K. J. Polym. Sci, A1, 1970, 8, 1647-1656; Gousse, C.; Gandini, A. Eur. Polym. J., 1997, 33, 667-671) as shown below under various conditions shown in Table 1.

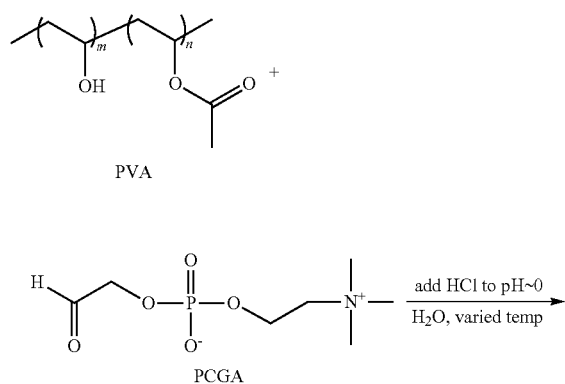

PVA

PCGA

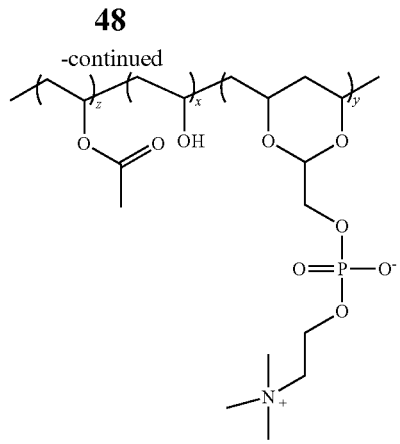

TABLE 1

| | Reaction conditions | | |
|---|---|---|---|
| Example # | PVA $M_w$ (kDa) | Feed ratio $[PCGA]_0/[OH_{(PVA)}]_0$ | Reaction temperature |
| Example 2 | 14 | 5% | r.t. |
| Example 3 | 14 | 10% | r.t. |
| Example 4 | 14 | 20% | r.t. |
| Example 5 | 14 | 20% | 60° C. |
| Example 6 | 14 | 20% | 40° C. |
| Example 7 | 47 | 40% | 40° C. |
| Example 8 | 47 | 20% | 40° C. |
| Example 9 | 100 | 40% | 40° C. |

Example 2

In a jacketed reactor, polyvinyl alcohol (PVA, KL-03, $M_w$=14,000 g/mol, 70.8 g) is dissolved in deionized water (280 mL) at 90° C. under stirring for 1 hour. The solution is then cooled down to room temperature to afford a 20 wt % PVA aqueous solution.

PCGA prepared in Example 1 (1.23 g), 20 wt % PVA solution (22.75 g) and deionized water (3.60 g) are mixed in a beaker, and followed by the addition of fuming HCl 37% (2.60 mL). The mixture is stirred until each component is fully dissolved. Then the mixture is transferred in a reactor, and stirred at room temperature for 18 hours. After the reaction, the pH of the mixture is adjusted to neutral (pH 5-8) using 5N NaOH solution. Then the mixture is purified by dialysis in periodically replaced fresh deionized water with a regenerated cellulose membrane (MWCO: 3.5-5 kDa) for 5 days. After purification, a PC-modified polyvinylalcohol aqueous solution is yielded, with sample ID: PVA-g-PC 01.

$^{31}$P-NMR spectrum shows that the chemical shift of this PC-modified PVA is shifted to −0.60 ppm, compared to that of PCGA at −0.35 ppm. The result confirms the successful attachment of PCGA to the PVA backbone, as well as the removal of residual PCGA during purification. $^1$H-NMR spectrum shows the acetalization degree (equals to the ratio of the reacted "—OH" and the total "—OH" of PVA polymer) is 4%, namely, the PC-modified PVA contained 2 PC units per 100 repeating units (vinyl alcohol units).

Example 3

PCGA prepared in Example 1 (2.45 g), 20 wt % PVA solution (22.62 g) and deionized water (2.40 g) are mixed in a beaker, and followed by the addition of fuming HCl 37%

(2.60 mL). The mixture is stirred until each component is fully dissolved. Then the mixture is transferred in a reactor, and stirred at room temperature for 18 hours. After the reaction, the pH of the mixture is adjusted to neutral (pH 5-8) using 5N NaOH solution. Then the mixture is purified by dialysis in periodically replaced fresh deionized water with a regenerated cellulose membrane (MWCO: 3.5-5 kDa) for 5 days. After purification, a PC-modified polyvinylalcohol aqueous solution is yielded, with sample ID: PVA-g-PC 02.

$^{31}$P-NMR spectrum shows the chemical shift of this PC-modified PVA is shifted to −0.60 ppm, compared to that of PCGA at −0.35 ppm. The result confirms the successful attachment of PCGA to the PVA backbone, as well as the removal of residual PCGA during purification. $^1$H-NMR spectrum shows the acetalization degree is 6%, namely, the PC-modified PVA contained 3 PC units per 100 repeating units.

Example 4

PCGA prepared in Example 1 (4.88 g) and 20 wt % PVA solution (22.70 g) are mixed in a beaker, and followed by the addition of fuming HCl 37% (2.60 mL). The mixture is stirred until each component is fully dissolved. Then the mixture is transferred in a reactor, and stirred at room temperature for 18 hours. After the reaction, the pH of the mixture is adjusted to neutral (pH 5~8) using 5N NaOH solution. Then the mixture is purified by dialysis in periodically replaced fresh deionized water with a regenerated cellulose membrane (MWCO: 3.5~5 kDa) for 5 days. After purification, a PC-modified polyvinylalcohol aqueous solution is yielded, with sample ID: PVA-g-PC 03.

$^{31}$P-NMR spectrum shows the chemical shift of this PC-modified PVA is shifted to −0.60 ppm, compared to that of PCGA at −0.35 ppm. The result confirms the successful attachment of PCGA to the PVA backbone, as well as the removal of residual PCGA during purification. $^1$H-NMR spectrum shows the acetalization degree is 8%, namely, the PC-modified PVA contained 4 PC units per 100 repeating units.

Example 5

PCGA prepared in Example 1 (5.03 g) and 20 wt % PVA solution (23.42 g) are mixed in a beaker, and followed by the addition of fuming HCl 37% (2.60 mL). The mixture is stirred until each component is fully dissolved. Then the mixture is transferred in a reactor, and stirred at 60° C. for 18 hours. After the reaction, the pH of the mixture is adjusted to neutral (pH 5-8) using 5N NaOH solution. Then the mixture is purified by dialysis in periodically replaced fresh deionized water with a regenerated cellulose membrane (MWCO: 3.5-5 kDa) for 5 days. After purification, a PC-modified polyvinylalcohol aqueous solution is yielded, with sample ID: PVA-g-PC 04.

$^{31}$P-NMR spectrum shows the chemical shift of this PC-modified PVA is shifted to −0.60 ppm, compared to that of PCGA at −0.35 ppm. The result confirms the successful attachment of PCGA to the PVA backbone, as well as the removal of residual PCGA during purification. $^1$H-NMR spectrum shows the acetalization degree is 8%, namely, the PC-modified PVA contained 4 PC units per 100 repeating units.

Example 6

PCGA prepared in Example 1 (4.91 g) and 20 wt % PVA solution (23.37 g) are mixed in a beaker, and followed by the addition of fuming HCl 37% (2.60 mL). The mixture is stirred until each component is fully dissolved. Then the mixture is transferred in a reactor, and stirred at 40° C. for 18 hours. After the reaction, the pH of the mixture is adjusted to neutral (pH 5-8) using 5N NaOH solution. Then the mixture is purified by dialysis in periodically replaced fresh deionized water with a regenerated cellulose membrane (MWCO: 3.55 kDa) for 5 days. After purification, a PC-modified polyvinylalcohol aqueous solution is yielded, with sample ID: PVA-g-PC 05.

$^{31}$P-NMR spectrum shows the chemical shift of this PC-modified PVA is shifted to −0.60 ppm, compared to that of PCGA at −0.35 ppm. The result confirms the successful attachment of PCGA to the PVA backbone, as well as the removal of residual PCGA during purification. $^1$H-NMR spectrum shows the acetalization degree is 13%, namely, the PC-modified PVA contained 6.5 PC units per 100 repeating units.

Example 7

In a jacketed reactor, polyvinyl alcohol (PVA, KP 6-98, $M_w$=47,000 g/mol, 21.8 g) is dissolved in deionized water (123.4 g) at 90° C. under stirring for 1 hour. The solution is then cooled down to room temperature to afford a 15 wt % PVA aqueous solution.

PCGA prepared in Example 1 (20.8 g), 15 wt % PVA solution (50.0 g) and deionized water (10.0 mL) are mixed in a beaker, and followed by the addition of 5N HCl aqueous solution (20.0 mL). The mixture is stirred until each component is fully dissolved. Then the mixture is transferred in a reactor, and stirred at 40° C. for 16 hours. After the reaction, the pH of the mixture is adjusted to neutral (pH 5-8) using 5N NaOH solution. Then the mixture is purified by dialysis in periodically replaced fresh deionized water with a regenerated cellulose membrane (MWCO: 10 kDa) for 5 days. After purification, a PC-modified polyvinylalcohol aqueous solution is yielded, with sample ID: PVA-g-PC 06.

$^{31}$P-NMR spectrum shows the chemical shift of this PC-modified PVA is shifted to −0.60 ppm, compared to that of PCGA at −0.35 ppm. The result confirms the successful attachment of PCGA to the PVA backbone, as well as the removal of residual PCGA during purification. $^1$H-NMR spectrum shows the acetalization degree is 16%, namely, the PC-modified PVA contained 8 PC units per 100 repeating units.

Example 8

PCGA prepared in Example 1 (10.4 g), 15 wt % PVA solution (50.0 g) and deionized water (20.4 mL) are mixed in a beaker, and followed by the addition of 5N HCl aqueous solution (20.0 mL). The mixture is stirred until each component is fully dissolved. Then the mixture is transferred in a reactor, and stirred at 40° C. for 16 hours. After the reaction, the pH of the mixture is adjusted to neutral (pH 5-8) using 5N NaOH solution. Then the mixture is purified by dialysis in periodically replaced fresh deionized water with a regenerated cellulose membrane (MWCO: 10 kDa) for 5 days. After purification, a PC-modified polyvinylalcohol aqueous solution is yielded, with sample ID: PVA-g-PC 07.

$^{31}$P-NMR spectrum shows the chemical shift of this PC-modified PVA is shifted to −0.60 ppm, compared to that of PCGA at −0.35 ppm. The result confirms the successful attachment of PCGA to the PVA backbone, as well as the removal of residual PCGA during purification. ¹H-NMR spectrum shows the acetalization degree is 13%, namely, the PC-modified PVA contained 6.5 PC units per 100 repeating units.

Example 9

In a jacketed reactor, polyvinyl alcohol (PVA, GH-22, $M_w$=100,000 g/mol, 17.8 g) is dissolved in deionized water (236.0 g) at 90° C. under stirring for 12 hour. The solution is then cooled down to room temperature to afford a 7 wt % PVA aqueous solution.

PCGA prepared in Example 1 (8.0 g), 7 wt % PVA solution (50.4 g) and deionized water (23.2 mL) are mixed in a beaker, and followed by the addition of 5N HCl aqueous solution (20.0 mL). The mixture is stirred until each component is fully dissolved. Then the mixture is transferred in a reactor, and stirred at 40° C. for 20 hours. After the reaction, the pH of the mixture is adjusted to neutral (pH 5-8) using 5N NaOH solution. Then the mixture is purified by dialysis in periodically replaced fresh deionized water with a regenerated cellulose membrane (MWCO: 10 kDa) for 5 days. After purification, a PC-modified polyvinylalcohol aqueous solution is yielded, with sample ID: PVA-g-PC 08.

¹H-NMR spectrum shows the acetalization degree is 9%, namely, the PC-modified PVA contained 4.5 PC units per 100 repeating units.

Example 10

PVA-g-PC 06 prepared in Example 7 is concentrated by rotary evaporator to afford the polymer solid content at 5.3 wt %. After filtration through a 5 μm filter, the polymer solution (0.190 g) is mixed with a tinted prepolymerization mixture (9.707 g) prepared according to the procedures described in Example 5 of WO1999026087 and deionized water (0.111 g). This polymer mixture is mixed thoroughly under 2500 rpm for 6 minutes, with sample ID: Formulation 01.

Formulation 01 in lens mold is cured with a UV light source (Hamamatsu with 297 nm filter, 6.5 mW/cm²) to produce hydrogel contact lenses. After 60 seconds of UV curing, demolding and delensing, the lenses are soaked in deionized water (10 mL), with sample ID: Lens 01.

Example 11

PVA-g-PC 08 prepared in Example 9 is concentrated by rotary evaporator to afford the polymer solid content at 3.7 wt %. After filtration through a 5 μm filter, the polymer solution (0.282 g) is mixed with a tinted prepolymerization mixture (9.704 g) prepared according to the procedures described in Example 5 of WO1999026087 and deionized water (0.030 g). This polymer mixture is mixed thoroughly under 2500 rpm for 6 minutes, with sample ID: Formulation 02.

Formulation 02 in lens molds is cured with a UV light source (Hamamatsu with 297 nm filter, 6.5 mW/cm²) to produce hydrogel lenses. After 60 seconds of UV curing, lemolding and delensing, the lenses are soaked in deionized water (10 mL), with sample ID: Lens 02.

Example 12

15 wt % PVA solution is concentrated by rotary evaporator to afford the polymer solid content at 5.9 wt %. After filtration through a 5 μm filter, the polymer solution (0.169 g) is mixed with a tinted prepolymerization mixture (9.695 g) prepared according to the procedures described in Example 5 of WO1999026087 and deionized water (0.131 g). This polymer mixture is mixed thoroughly under 2500 rpm for 6 minutes, with sample ID: Formulation 03.

Formulation 03 in lens molds is cured with a UV light source (Hamamatsu with 297 nm filter, 6.5 mW/cm²) to produce hydrogel lenses. After 60 seconds of UV curing, demolding and delnsing, the lenses are soaked in deionized water (10 mL), with sample ID: Lens 03.

Example 13

A tinted prepolymerization mixture (10.000 g) prepared according to the procedures described in Example 5 of WO1999026087 is mixed thoroughly under 2500 rpm for 6 minutes, with sample ID: Formulation 04.

Formulation 04 in lens molds is cured with a UV light source (Hamamatsu with 297 nm filter, 6.5 mW/cm²) to produce hydrogel lenses. After 60 seconds of UV curing, demolding and delensing, the lenses are soaked in deionized water (10 mL), with sample ID: Lens 04.

Example 14

C-reactive protein (CRP) is a naturally occurring protein that has binding specificity towards the phosphorylcholine moieties, as understood by a person skilled in the art. Fluorescently labelled CRP provides the detection method of the PC containing polymers on the contact lenses surface. This method also allows quantitative analysis by fluorescence (see, Goda, T., Kjall, P., Ishihara, K., Richter-Dahlfors, A., Miyahara, Y. Adv. Healthcare Mater., 2014, 3, 1733-1738; Goda, T., Ishihara, K., Miyahara, Y. J. Appl. Polym. Sci., 2015, 132, 41766; Kitayama, Y., Takeuchi, T. Anal. Chem. 2014, 86, 5587-5594).

After soaking in deionized water for 3 days to reach the equilibrium of leaching, the lenses produced in Examples 10-13 are withdrawn and incubated with fluorescently labelled CRP at room temperature for 3 hours. Images of the lens surface are taken afterwards. Green fluorescence has been detected with Lens 01 and Lens 02, indicating the presence of PC-containing polymers on the surfaces of Lens 01 and Lens 02. In contrast, no fluorescence is observed on the surfaces of Lens 03 and Lens 04. The results confirms the presence of PC-modified PVA on the contact lens surface, and further confirms PC-modified PVA can be leached out from the bulk of these hydrogel lenses.

All the publications, patents, and patent application publications, which have been cited herein above in this application, are hereby incorporated by reference in their entireties.

What is claimed is:

1. A soft contact lens, comprising: a lens bulk material which is a crosslinked polymeric material having a polymer matrix; and at least one non-polymerizable preformed phosphorylcholine-containing polymer which each comprises (a) first repeating units of vinyl alcohol and/or vinyl acetate and (b) second repeating units of 6-membered acetal ring substituted with a phosphorylcholine-containing group, wherein the non-polymerizable preformed phosphorylcholine-containing polymer is not covalently attached to the crosslinked polymeric material and is distributed within the polymer matrix.

2. The soft contact lens of claim 1, wherein said at least one non-polymerizable preformed phosphorylcholine-containing polymer each comprises (a) the first repeating units in an amount, designated as M1, of from about 60% to about 99% by mole, wherein the first repeating units have a formula of

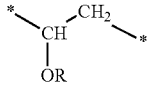

in which R is H or —C(O)CH$_3$, and (b) the second repeating units in an amount, designated as M2, of from about 1% to about 40% by mole, wherein the second repeating units have a formula of

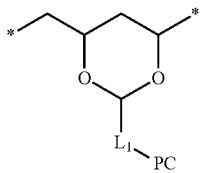

in which L$_1$ is a C$_1$-C$_6$ divalent alkylene radical and PC is a monovalent zwitterionic group of

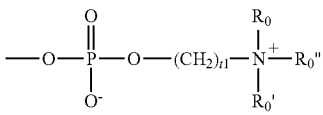

in which t1 is an integer of 1 to 5 and R$_0$, R$_0$' and R$_0$" independently of one another are C$_1$-C$_4$ alkyl, provided that (M1+M2) is greater than about 90% by mole.

3. The soft contact lens of claim 2, wherein the soft contact lens comprises at least two non-polymerizable preformed phosphorylcholine-containing polymers, wherein one of the two non-polymerizable preformed phosphorylcholine-containing polymers has a number-average molecular weight of from 10,000 to 100,000 Daltons while the other has a number-average molecular weight of from 200,000 to 2,000,000.

4. The soft contact lens of claim 3, wherein the weight proportion of the two non-polymerizable preformed phosphorylcholine-containing polymers is from 1:1 to 5:1.

5. A coated soft contact lens, comprising:
a lens body, wherein the lens body comprises a crosslinked polymeric material comprising repeating units of at least one arylborono-containing vinylic monomer; and
a coating thereon, wherein the coating comprises a layer of a phosphorylcholine-containing polymer which comprises
(a) repeating units of vinyl alcohol, and
(b) phosphorylcholine-containing repeating units each having a formula of

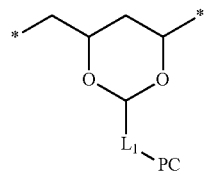

in which L$_1$ is a C$_1$-C$_6$ divalent alkylene radical and PC is a monovalent zwitterionic group of

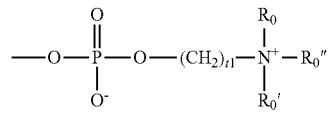

in which t1 is an integer of 1 to 5 and R$_0$, R$_0$' and R$_0$" independently of one another are C$_1$-C$_4$ alkyl,
wherein the coating is covalent attached onto the lens body through linkages each formed between one of boronic acid groups of the crosslinked polymeric material and one of the 1,3-diol moieties of the phosphorylcholine-containing polymer.

6. The coated soft contact lens of claim 5, wherein the arylborono-containing vinylic monomer is a vinylic monomer of formula (VIII)

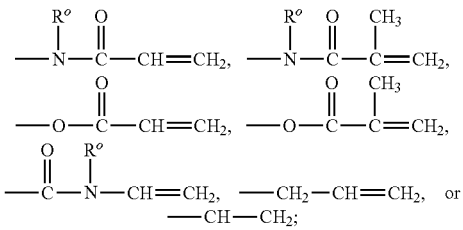

in which:
R$_b$ is H, NO$_2$, F, Cl, or CF$_3$;
Q is a monovalent radical of

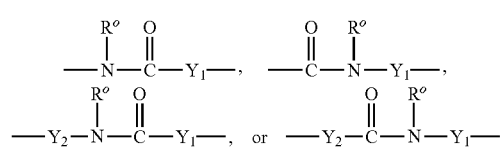

L$_2$ is a direct bond, a C$_1$-C$_4$ alkylene divalent radical, a divalent radical of in which Y$_1$ is CH(OH) or a C$_1$-C$_4$ alkylene divalent radical, Y$_2$ is a C$_1$-C$_4$ alkylene divalent radical, and R$^o$ is H or a C$_1$-C$_4$ alkyl.

7. The coated soft contact lens of claim 6, wherein the crosslinked polymeric material is a non-silicone hydrogel material.

8. The coated soft contact lens of claim 7, wherein the non-silicone hydrogel material comprises at least 50% by mole of repeating units of at least one hydroxyl-containing vinylic monomer.

9. The coated soft contact lens of claim 7, wherein the non-silicone hydrogel material comprises at least 50% by mole of repeating units of vinyl alcohol.

10. The coated soft contact lens of claim 7, wherein the non-silicone hydrogel material is a crosslinking product of at least one water-soluble actinically-polymerizable polyvinyl alcohol prepolymer in the presence or absence of a vinylic monomer and/or vinylic crosslinking agent, wherein the water-soluble actinically-polymerizable polyvinyl alcohol prepolymer comprises:

repeating vinyl alcohol units of

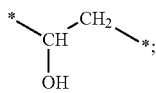

and
repeating crosslinking units of formula (I);

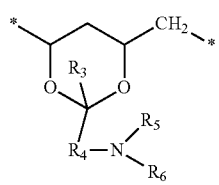

in which
$R_3$ is hydrogen or a $C_1$-$C_6$ alkyl group;
$R_4$ is a $C_1$-$C_6$ alkylene divalent radical;
$R_5$ is hydrogen or $C_1$-$C_6$ alkyl;
$R_6$ is an ethylenically unsaturated group of

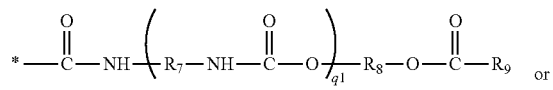

or

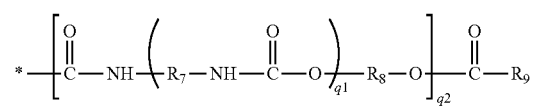

in which q1 and q2 independently of each another are zero or one, and $R_7$ and $R_8$ independently of one another are a $C_2$-$C_8$ alkylene divalent radical, $R_9$ is $C_2$-$C_8$ alkenyl.

11. The coated soft contact lens of claim 10, wherein the water-soluble actinically-polymerizable polyvinylalcohol prepolymer further comprises repeating units of formula (II)

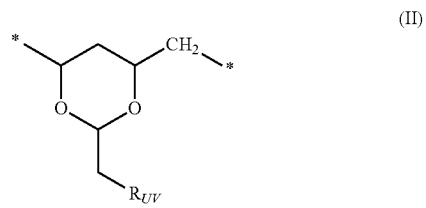

in which $R_{UV}$ is a monovalent radical of any one of formula (III)-(VII)

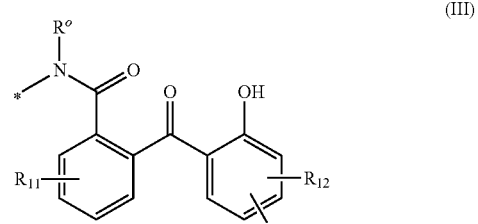

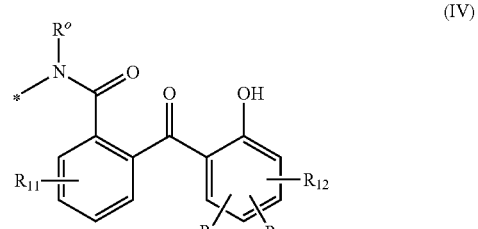

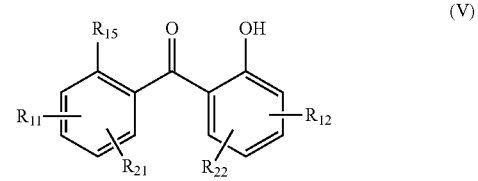

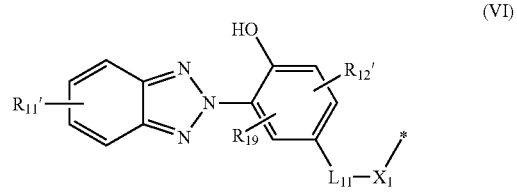

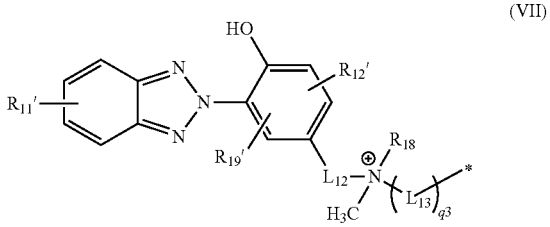

in which:
$R^o$ is H or $CH_3$;
$R_{11}$, $R_{12}$ and $R_{12}'$ independent of one other are H, $CH_3$, $CCl_3$, $CF_3$, Cl, Br, NR'R'' in which R' and R'' independent of each other are H or $C_1$-$C_4$ alkyl, OH, or $OCH_3$;
$R_{11}'$ independent of each other are H, $CH_3$, $CCl_3$, $CF_3$, Cl, Br, NR'R'' in which R' and R'' independent of each other are H or $C_1$-$C_4$ alkyl, OH, $OCH_3$, $SO_3H$, or $SO_3^-Na^+$;

$R_{13}$ and $R_{14}$ independent of each other are H or a first hydrophilic group which is

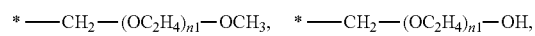
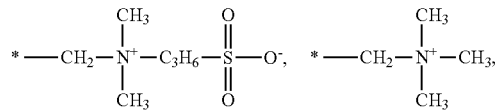
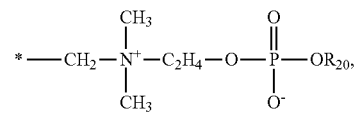
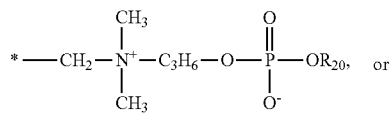
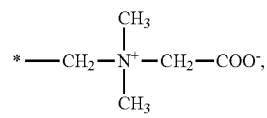

provided that at least one of $R_{13}$ and $R_{14}$ is the first hydrophilic group;

q3 is zero or 1;

n1 is an integer of 2 to 25;

$R_{15}$ is H, *—COOH, *—CONH—$C_2H_4$—$(OC_2H_4)_{n1}$—$OCH_3$, or *—CONH—$C_2H_4$—$(OC_2H_4)_{n1}$—OH;

one of $R_{16}$ and $R_{17}$ is H or a second hydrophilic group which is *—$CH_2$—$(OC_2H_4)_{n1}$—$OCH_3$, *—

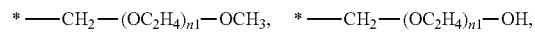
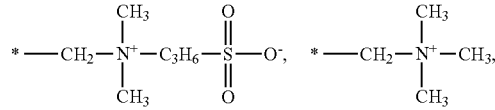
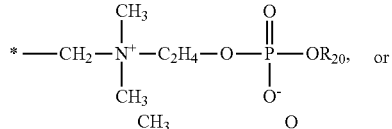

while the other of $R_{16}$ and $R_{17}$ is

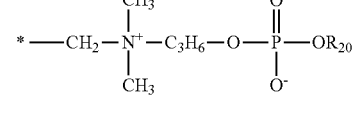
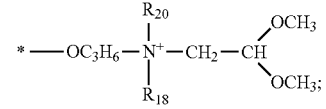

$R_{18}$ is $CH_3$, $C_2H_5$,

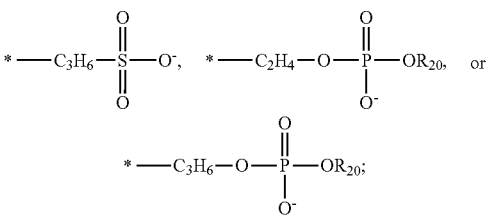

$R_{19}$ is $SO_3Na$,

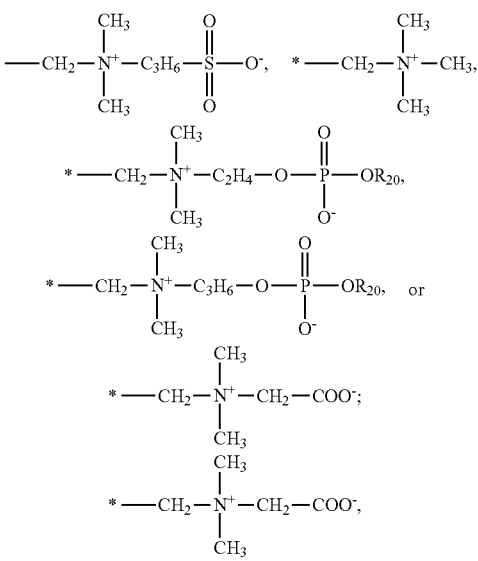

$R_{19}'$ is H, $SO_3Na$,

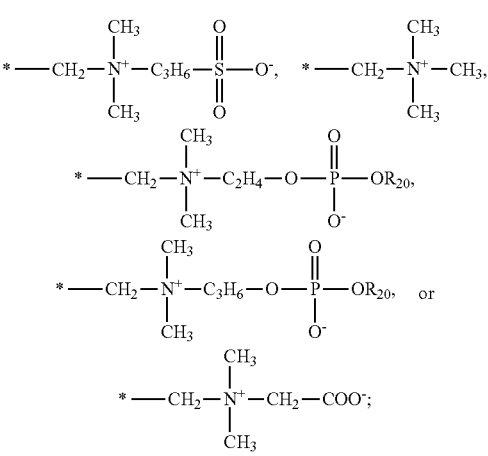

$R_{20}$ is methyl or ethyl;

$L_{11}$ is a linkage of

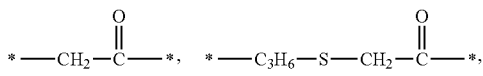

-continued

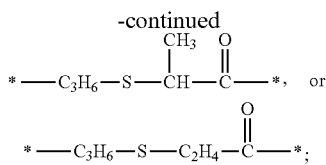

$L_{12}$ is a linkage of

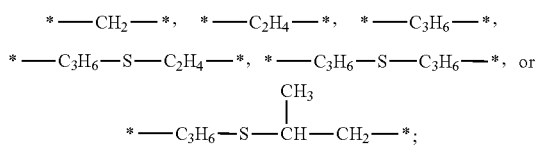

$L_{13}$ is a linkage of

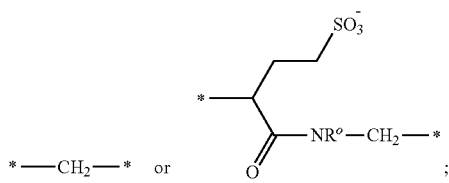

X1 is O or $NR^o$;
one of $R_{21}$ and $R_{22}$ is H or a second hydrophilic group which is

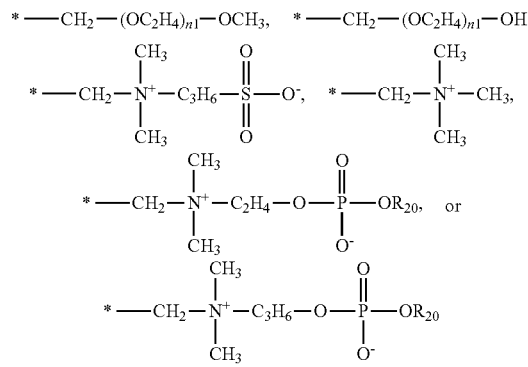

while the other of $R_{21}$ and $R_{22}$ is a divalent radical of

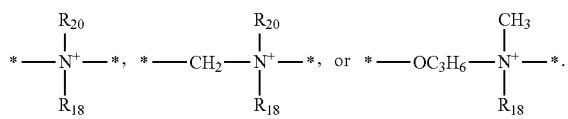

12. The coated soft contact lens of claim 6, wherein the crosslinked polymeric material is a silicone hydrogel material which comprises (a) repeating units of at least one silicone-containing vinylic monomer and/or at least one silicone-containing vinylic crosslinker and (b) repeating units of at least one one hydrophilic vinylic monomer.

13. The coated soft contact lens of claim 12, wherein the silicone hydrogel material comprises repeating units of at least one hydrophilic N-vinyl amide monomer.

14. The coated soft contact lens of claim 12, wherein the silicone hydrogel material has an oxygen permeability of at least 40 barrers.

15. The coated soft contact lens of claim 14, having: a water content of from about 10% to about 80% by weight measured at a temperature of from about 22° C. to 28° C.; an elastic modulus of from about 0.2 MPa to about 1.5 MPa; a UVB transmittance of about 10% or less between 280 and 315 nanometers; a UVA transmittance of about 30% or less between 315 and 380 nanometers; and a Violet transmittance of from 0% to about 70% between 380 nm and 440 nm, when being fully hydrated.

16. An ophthalmic solution, comprising:
from about 0.01% to about 2% by weight of a phosphorylcholine-containing polymer which comprises (a) repeating units of vinyl alcohol and (b) phosphorylcholine-containing repeating units each having a formula of

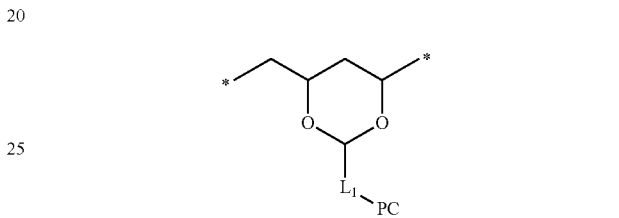

in which $L_1$ is a $C_1$-$C_6$ divalent alkylene radical and PC is a monovalent zwitterionic group of

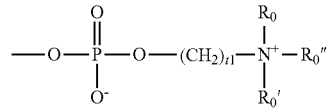

in which t1 is an integer of 1 to 5 and $R_0$, $R_0'$ and $R_0''$ independently of one another are $C_1$-$C_4$ alkyl; and at least one buffering agent for maintaining a pH of from about 6.5 to about 9.0, wherein the ophthalmic solution has a pH of from about 6.5 to about 9.0, a tonicity of from about 200 to about 450 milliosmol (mOsm) at 25° C., and a viscosity of from about 1 centipoise to about 5 centipoises at 25° C.

17. The ophthalmic solution of claim 16, wherein the ophthalmic solution is a packaging solution for packaging and sterilizing contact lenses in packages.

18. The soft contact lens of claim 4, wherein the crosslinked polymeric material is a non-silicone hydrogel material.

19. The soft contact lens of claim 18, wherein the non-silicone hydrogel material comprises at least 50% by mole of repeating units of at least one hydroxyl-containing vinylic monomer.

20. The soft contact lens of claim 18, wherein the non-silicone hydrogel material comprises at least 50% by mole of repeating units of vinyl alcohol.

21. The soft contact lens of claim 18, wherein the non-silicone hydrogel material is a crosslinking product of at least one water-soluble actinically-polymerizable polyvinyl alcohol prepolymer in the presence or absence of a vinylic monomer and/or vinylic crosslinking agent, wherein the water-soluble actinically-polymerizable polyvinyl alcohol prepolymer comprises:

repeating vinyl alcohol units of

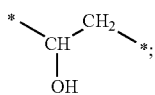

and
repeating crosslinking units of formula (I):

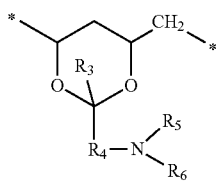

(I)

in which
R$_3$ is hydrogen or a C$_1$-C$_6$ alkyl group;
R$_4$ is a C$_1$-C$_6$ alkylene divalent radical;
R$_5$ is hydrogen or C$_1$-C$_6$ alkyl;
R$_6$ is an ethylenically unsaturated group of

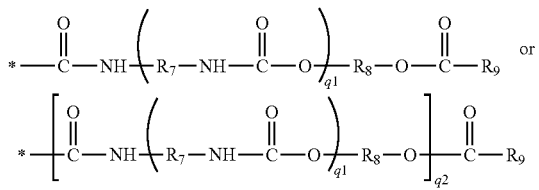

in which q1 and q2 independently of each another are zero or one, and R$_7$ and R$_8$ independently of one another are a C$_2$-C$_8$ alkylene divalent radical, R$_9$ is C$_2$-C$_8$ alkenyl.

22. The soft contact lens of claim 21, wherein the water-soluble actinically-polymerizable polyvinylalcohol prepolymer further comprises repeating units of formula (II)

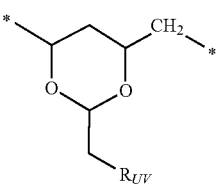

(II)

in which R$_{UV}$ is a monovalent radical of any one of formula (III)-(VII)

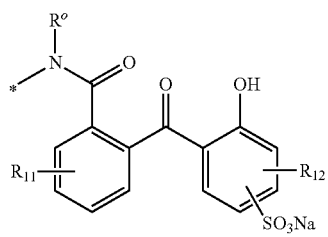

(III)

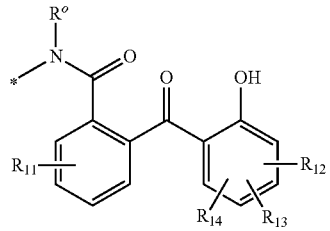

(IV)

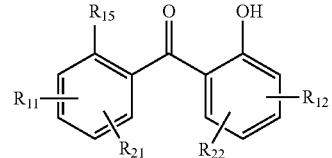

(V)

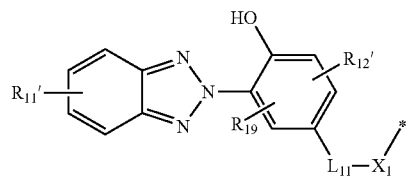

(VI)

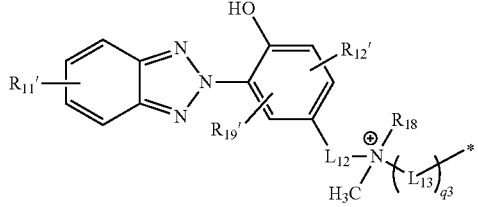

(VII)

in which:

R$^o$ is H or CH$_3$;

R$_{11}$, R$_{12}$ and R$_{12}$' independent of one other are H, CH$_3$, CCl$_3$, CF$_3$, Cl, Br, NR'R" in which R' and R" independent of each other are H or C$_1$-C$_4$ alkyl, OH, or OCH$_3$;

R$_{11}$' independent of each other are H, CH$_3$, CCl$_3$, CF$_3$, Cl, Br, NR'R" in which R' and R" independent of each other are H or C$_1$-C$_4$ alkyl, OH, OCH$_3$, SO$_3$H, or SO$_3$$^-$Na$^+$;

R$_{13}$ and R$_{14}$ independent of each other are H or a first hydrophilic group which is

*—CH$_2$—(OC$_2$H$_4$)$_{n1}$—OCH$_3$,  *—CH$_2$—(OC$_2$H$_4$)$_{n1}$—OH,

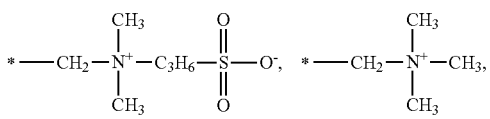

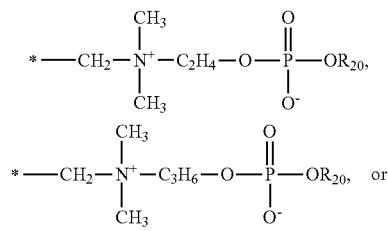

-continued

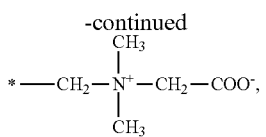

provided that at least one of $R_{13}$ and $R_{14}$ is the first hydrophilic group;

q3 is zero or 1;

n1 is an integer of 2 to 25;

$R_{15}$ is H, *—COOH, *—CONH—$C_2H_4$—$(OC_2H_4)_{n1}$—$OCH_3$, or *—CONH—$C_2H_4$—$(OC_2H_4)_{n1}$—OH;

one of $R_{16}$ and $R_{17}$ is H or a second hydrophilic group which is

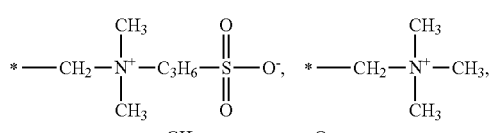

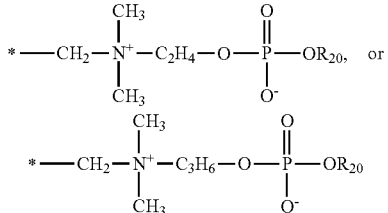

while the other of $R_{16}$ and $R_{17}$ is

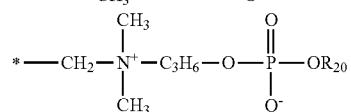

$R_{18}$ is $CH_3$, $C_2H_5$,

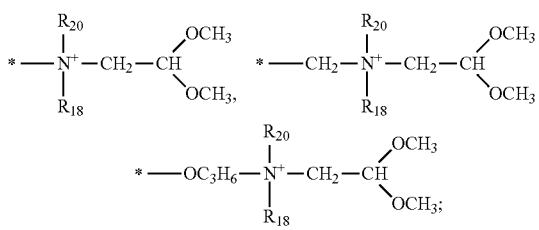

$R_{19}$ is $SO_3Na$,

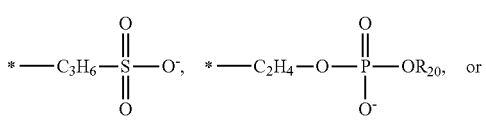

-continued

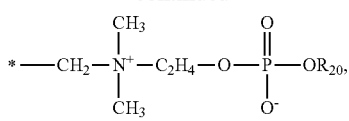

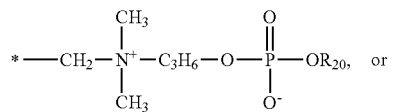

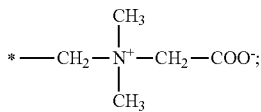

$R_{19}'$ is H, $SO_3Na$,

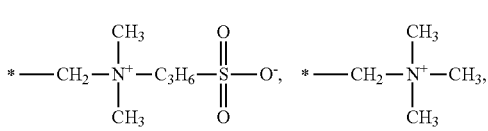

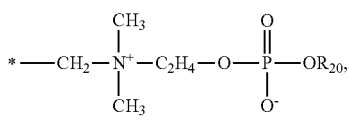

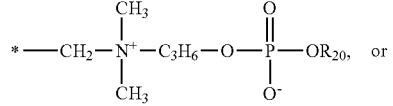

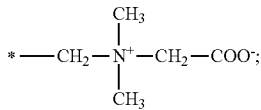

$R_{20}$ is methyl or ethyl;

$L_{11}$ is a linkage of

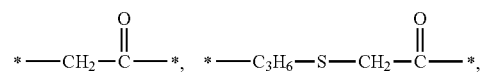

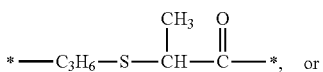

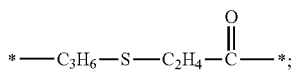

$L_{12}$ is a linkage of

*—$CH_2$—*, *—$C_2H_4$—*, *—$C_3H_6$—*,

*—$C_3H_6$—S—$C_2H_4$—*, *—$C_3H_6$—S—$C_3H_6$—*, or

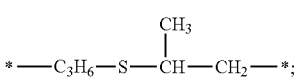

$L_{13}$ is a linkage of

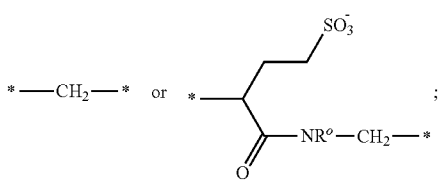

X1 is O or NR°;
one of $R_{21}$ and $R_{22}$ is H or a second hydrophilic group which is
is

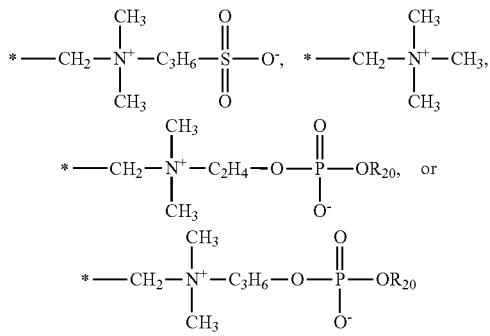

while the other of $R_{21}$ and $R_{22}$ is a divalent radical of

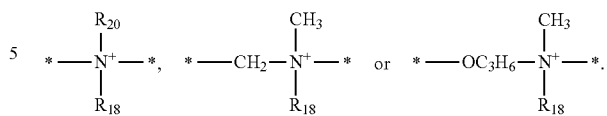

23. The soft contact lens of claim 4, wherein the cross-linked polymeric material is a silicone hydrogel material which comprises (a) repeating units of at least one silicone-containing vinylic monomer and/or at least one silicone-containing vinylic crosslinker and (b) repeating units of at least one one hydrophilic vinylic monomer.

24. The soft contact lens of claim 23, wherein the silicone hydrogel material comprises repeating units of at least one hydrophilic N-vinyl amide monomer.

25. The soft contact lens of claim 23, wherein the silicone hydrogel material has an oxygen permeability of at least 40 barrers.

26. The soft contact lens of claim 25, having: a water content of from about 10% to about 80% by weight measured at a temperature of from about 22° C. to 28° C.; an elastic modulus of from about 0.2 MPa to about 1.5 MPa; a UVB transmittance of about 10% or less between 280 and 315 nanometers; a UVA transmittance of about 30% or less between 315 and 380 nanometers; and a Violet transmittance of from 0% to about 70% between 380 nm and 440 nm, when being fully hydrated.

* * * * *